(12) United States Patent
Medlock et al.

(10) Patent No.: US 8,781,399 B2
(45) Date of Patent: *Jul. 15, 2014

(54) DYNAMICALLY RECONFIGURABLE UNIVERSAL TRANSMITTER SYSTEM

(71) Applicant: Intel Mobile Communications GmbH, Neubiberg (DE)

(72) Inventors: Joel D. Medlock, Campbell, CA (US); Uma Jha, Placentia, CA (US); David M. Holmes, Cupertino, CA (US); Andrea Y. J. Chen, Campbell, CA (US); Madasamy Kartheepan, San Jose, CA (US)

(73) Assignee: Intel Mobile Communications GmbH, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/958,952

(22) Filed: Aug. 5, 2013

(65) Prior Publication Data

US 2013/0316666 A1 Nov. 28, 2013

Related U.S. Application Data

(60) Continuation of application No. 11/748,311, filed on May 14, 2007, now Pat. No. 8,515,352, which is a division of application No. 09/922,484, filed on Aug. 3, 2001, now Pat. No. 7,233,810.

(60) Provisional application No. 60/222,853, filed on Aug. 3, 2000.

(51) Int. Cl.
*H04B 1/00* (2006.01)
*H03C 7/02* (2006.01)

(52) U.S. Cl.
USPC .............................. 455/61; 455/102

(58) Field of Classification Search
USPC ................. 455/59, 61, 101–103; 375/299
See application file for complete search history.

(56) References Cited

U.S. PATENT DOCUMENTS

| | | | |
|---|---|---|---|
| 4,755,987 | A | 7/1988 | Lee et al. |
| 5,471,471 | A | 11/1995 | Freeburg et al. |
| 5,479,397 | A | 12/1995 | Lee |

(Continued)

FOREIGN PATENT DOCUMENTS

| | | |
|---|---|---|
| EP | 0 582 323 A1 | 2/1994 |
| EP | 0 998 056 A2 | 5/2000 |

(Continued)

OTHER PUBLICATIONS

Gunn et al., "A Low-Power DSP Core-Based Software Radio Architecture," IEEE Journal on Selected Areas in Communications, 1999;17(4):574-590, IEEE Inc. New York, USA.

(Continued)

*Primary Examiner* — Lee Nguyen
(74) *Attorney, Agent, or Firm* — Schiff Hardin LLP

(57) ABSTRACT

A dynamically reconfigurable universal transmitter system is disclosed herein. The electronic device includes multiple transmitter resources for generating transmission signals, an output bus; and an antenna summer coupled to the output bus. The output bus is selectively coupled to the plurality of transmitter resources and it selectively receives transmission signals from the plurality of transmission resources. The antenna summer stores transmission signals received on the output bus.

5 Claims, 16 Drawing Sheets

(56) References Cited

U.S. PATENT DOCUMENTS

| | | |
|---|---|---|
| 5,745,527 A | 4/1998 | Kelton et al. |
| 5,777,991 A | 7/1998 | Adachi et al. |
| 5,825,242 A | 10/1998 | Prodan et al. |
| 5,828,658 A | 10/1998 | Ottersten et al. |
| 5,864,300 A | 1/1999 | Cho et al. |
| 5,907,580 A | 5/1999 | Cummings |
| 5,991,643 A | 11/1999 | Chao-Cheng et al. |
| 6,052,605 A | 4/2000 | Meredith et al. |
| 6,085,076 A | 7/2000 | Lindsay et al. |
| 6,091,788 A | 7/2000 | Keskitalo et al. |
| 6,111,863 A | 8/2000 | Rostoker et al. |
| 6,212,242 B1 | 4/2001 | Smith et al. |
| 6,449,469 B1 | 9/2002 | Miyahara et al. |
| 6,529,496 B1 | 3/2003 | Yeom et al. |
| 6,718,161 B1 | 4/2004 | Westall et al. |
| 6,856,625 B1 | 2/2005 | Shamsunder et al. |
| 6,947,490 B1 | 9/2005 | Edwards et al. |
| 7,027,782 B2 | 4/2006 | Moon et al. |
| 7,079,816 B2 | 7/2006 | Khorram et al. |
| 8,515,352 B2 * | 8/2013 | Medlock et al. ............... 455/61 |
| 2001/0001611 A1 | 5/2001 | Yuzawa |
| 2003/0027540 A1 | 2/2003 | Da Torre |
| 2004/0157646 A1 | 8/2004 | Raleigh et al. |
| 2004/0176137 A1 | 9/2004 | Doi |
| 2005/0186986 A1 | 8/2005 | Hansen et al. |
| 2005/0233752 A1 | 10/2005 | Laroia et al. |

FOREIGN PATENT DOCUMENTS

| | | |
|---|---|---|
| WO | WO-97/49199 A2 | 12/1997 |
| WO | WO-99/62194 A1 | 12/1999 |
| WO | WO-00/68803 A1 | 11/2000 |

OTHER PUBLICATIONS

Kenington, P.B., "Emerging Technologies for Software Radio," Apr. 1999, Electronics and Communication Engineering Journal, Institute of Electrical Engineers, London, GB, pp. 69-83, XP000903140.

* cited by examiner

MUX SELECTOR TABLE 400B

| | Select Tap 1 456 | Select Tap 2 458 | Select Tap 3 460 | Select Tap 4 462 | Select Tap 5 464 | Select Tap 6 466 | Select Tap 7 468 | Select Tap 8 470 |
|---|---|---|---|---|---|---|---|---|
| | 3 | 2 | -1 | -1 | -1 | -1 | -1 | -1 |
| 0 | 1 | -1 | -1 | | | | | |
| 2 | 3 | -1 | -1 | -1 | -1 | -1 | | |
| 0 | 1 | -1 | -1 | -1 | -1 | -1 | | |
| 2 | 3 | -1 | -1 | -1 | -1 | -1 | | |
| 0 | 1 | -1 | -1 | -1 | -1 | -1 | | |

FIGURE 4B

DYNAMICALLY RECONFIGURABLE UNIVERSAL TRANSMITTER SYSTEM

CROSS-REFERENCE TO RELATED APPLICATIONS

This application is a continuation of Ser. No. 11/748,311 filed May 14, 2007, which is a divisional of Ser. No. 09/922,484 filed Aug. 3, 2001, now U.S. Pat. No. 7,233,810, which claims priority to the provisional patent application with Ser. No. 60/222,853 filed Aug. 3, 2000.

Related applications, which are incorporated herein by reference, are:
IMPROVED APPARATUS AND METHOD FOR MULTI-THREADED SIGNAL PROCESSING
Ser. No. 09/492,634, filed on Jan. 27, 2000.
METHOD AND APPARATUS FOR TIME-SLICED AND MULTI-THREADED DATA PROCESSING IN A COMMUNICATION SYSTEM
Ser. No. 09/920,093, filed on Jul. 31, 2001.
VIRTUAL MACHINE INTERFACE FOR HARDWARE RECONFIGURABLE AND SOFTWARE PROGRAMMABLE PROCESSORS
Ser. No. 09/828,381, filed on Apr. 5, 2001.
METHOD AND APPARATUS FOR SOFTWARE-BASED ALLOCATION AND SCHEDULING OF HARDWARE RESOURCES IN AN ELECTRONIC DEVICE
Ser. No. 09/922,484, filed concurrently herewith.
A CONFIGURABLE CODE GENERATOR SYSTEM FOR SPREAD SPECTRUM APPLICATIONS
Ser. No. 09/751,782, filed on Dec. 29, 2000.
METHOD OF GENERATING A CONFIGURATION FOR A CONFIGURABLE SPREAD SPECTRUM COMMUNICATION DEVICE
Ser. No. 09/772,582, filed on Jan. 29, 2001.

Only application Ser. No. 09/922,484 is filed simultaneously herewith.

TECHNICAL FIELD

The present claimed invention relates to the field of wireless communication. In particular, the present claimed invention relates to an apparatus and a method for preparing data for transmitting from a communication device.

BACKGROUND OF THE INVENTION

Electronic communication devices, such as cell phones, base stations, global positioning systems (GPS) are ubiquitous in everyday business and personal use. Among the many communication applications/systems are: fixed wireless, unlicensed (FCC) wireless, local area network (LAN), cordless telephony, personal base station, telemetry, mobile wireless, and other digital data processing applications. While each of these applications utilizes direct sequence spread spectrum (DSSS) communication protocols, they generally utilize unique and incompatible spreading and modulation protocols for signal transmissions. Besides the spread spectrum communication protocols, time division multiple access (TDMA) communication protocols also exist, along with upcoming air interfaces such as orthogonal frequency division multiplexing (OFDM). And each communication protocol may require unique hardware, software, and methodologies for transmitting signals from a communication device. This practice can be costly in terms of design, testing, manufacturing, and infrastructure resources. As a result, a need arises to overcome the limitations associated with the varied hardware, software, and methodology of transmitting digital signals that are unique and incompatible between each of the various communication protocols.

Furthermore, each given communication protocol can have incremental improvements that yield existing software, hardware, or infrastructure obsolete. This practice can be costly in terms of design, testing, manufacturing, and infrastructure resources. Consequently, a need also arises to overcome the lack of forward compatibility associated with incremental improvements in communication protocols.

Transmitter hardware is utilized by the various communication protocols to perform functions such as assemble data, scale its power, scramble its data, and modulate it onto a carrier signal. Within a given communication protocol, a significant quantity of channel formats can be designed for communication between devices. For example, in some communication protocols over fifty different types of channel formats are utilized to communicate the data, control, and status information between multiple communication devices. Given the dynamic environments in which communication systems operate, the quantity of different types of channels actually needed by a given communication device is always changing. However, if these different channel formats are implemented on transmitter hardware that is unique to the format of the given channel, or class of channel, it may not be compatible to process other channel formats. Thus, transmitter hardware unique to some channel formats may frequently sit idle while transmitter hardware for other types of channel formats is totally consumed. Thus, there may be a mismatch in the quantity of transmitter resources designed for the different channel formats, and the quantity of transmitter resources needed in actual use. For example, too many resources may be designed for voice channels, while there may be insufficient resources designed for pilot channels. This mismatch can translate into a capacity-limiting factor for a communication device due to a shortage of resources for one or more types of channel format. Thus a need arises to overcome the potential mismatch between transmitter resources designed for a specific channel format and the changing transmitter resource demand in a given communication device.

Transmitters can send data signals to one or more antenna for transmission to another communication device. However, if a communication device establishes a hard-coded relationship between transmitter resources and antenna resources, then the application of the communication device maybe limited. For example, a hard-coded device not designed specifically to accommodate space diversity transmission may not be able to communicate using this protocol. Furthermore, if the sector boundaries, distribution of antenna within the sector, or quantity of overall antennae were modified for a communication device, then the transmitter resources and interface between the transmitter resources and the antennae may require an entirely new design. Additionally, if an antenna has a limited amount of transmitter resources coupled to it, then its transmission capability may be limited, even though transmitter resources tied to adjacent antennae sit idle. If additional transmitter resources are provided to accommodate growth, they may still be limited to the antenna in which they are hard wired and unavailable for combined application to a given critical antenna. The limited flexibility of a fixed interface between transmitter resources and antenna resources can be inefficient in terms of limited capacity of a device and in terms of redesign, infrastructure costs and time delays to accommodate new designs for new applications. Thus a need arises to overcome the limitations of fixed interfaces between transmitter resources and antenna resources.

One conventional solution to linking transmitter resources to antenna resources is a crossbar switch that allows transmitter resources to couple to different antennae. However, the crossbar switch is costly, complex and switch intensive. And given the unpredictable manner in which data is transmitted over antennae, e.g., due to the mobile nature of many wireless communications, there is a frequent demand to change switching relationships between transmitter resources and antenna resources. Consequently a need arises to overcome the limitations of a cross bar switch in selectively coupling transmitter resources to antenna resources.

If data is 'pushed' through the communication device into the transmitter, then it may cause contentions and bottlenecks, which are an inefficient use of hardware resources and may cause reduced performance and dropped calls. Pushing data means that an upstream resource controls the transmission of the data to downstream resources. To avoid cumulative power spikes arising from simultaneous transmission of concurrent channels, e.g., using high power pilot signals, a system can monitor and manage the timing of channels provided to the transmitter to ensure they are staggered. However, this technique can require complicated and inefficient overhead in terms of associated monitoring hardware and software. Additionally, the push data paradigm can cause system interrupts and idle hardware if upstream resources have exceeded downstream resources and a bottleneck of data arises. Thus, a need arises for a method to overcome the limitations of pushing data through a communication device to the transmitter.

SUMMARY OF THE INVENTION

The present invention provides a method and apparatus that overcomes the limitations associated with the varied hardware, software, and methodology of transmitting digital signals that are unique and incompatible between each of the various communication protocols. Furthermore, the present invention overcomes the lack of forward compatibility associated with incremental improvements in communication protocols. The present invention also overcomes the potential mismatch between transmitter resources designed for a specific channel format and the changing transmitter resource demand in a given communication device. The limitations of fixed interfaces between transmitter resources and antenna resources and the limitations of a cross bar switch in selectively coupling transmitter resources to antenna resources are also overcome by the method and apparatus of the present invention. Additionally, the present invention overcomes the limitations of pushing data through a communication device to the transmitter.

A first embodiment of the present invention provides a dynamically reconfigurable universal transmitter system. The electronic device includes multiple transmitter resources for generating transmission signals, an output bus, and an antenna summer coupled to the output bus. The output bus is selectively coupled to the plurality of transmitter resources and it selectively receives transmission signals from the plurality of transmission resources. The antenna summer stores transmission signals received on the output bus.

A second embodiment of the present invention provides a configurable transmitter resource for generating any one of a plurality of channel formats. The configurable transmitter includes a computer readable memory, a processor and a configurable modulator coupled to each other. The computer readable memory contains information for a plurality of channel formats to which the configurable transmitter resource can be configured. The computer readable memory contains instructions and data that, when executed on the controller, implement a method for operating the configurable transmitter resource. And the configurable modulator includes a selective interconnect for selectively providing one of a plurality of data samples for modulating a data signal.

These and other objects and advantages of the present invention will become apparent to those of ordinary skill in the art after having read the following detailed description of the preferred embodiments, which are also illustrated in the various drawing figures.

BRIEF DESCRIPTION OF THE DRAWINGS

The drawings included herewith are incorporated in and form a part of this specification. The drawings illustrate embodiments of the invention and, together with the description, serve to explain the principles of the invention. It should be understood that the drawings referred to in this description are not drawn to scale unless specifically noted as such.

FIG. 4B is a table of data for dynamically operating the configurable demux unit, in accordance with one embodiment of the present invention.

DETAILED DESCRIPTION OF THE INVENTION

Figure 1A:
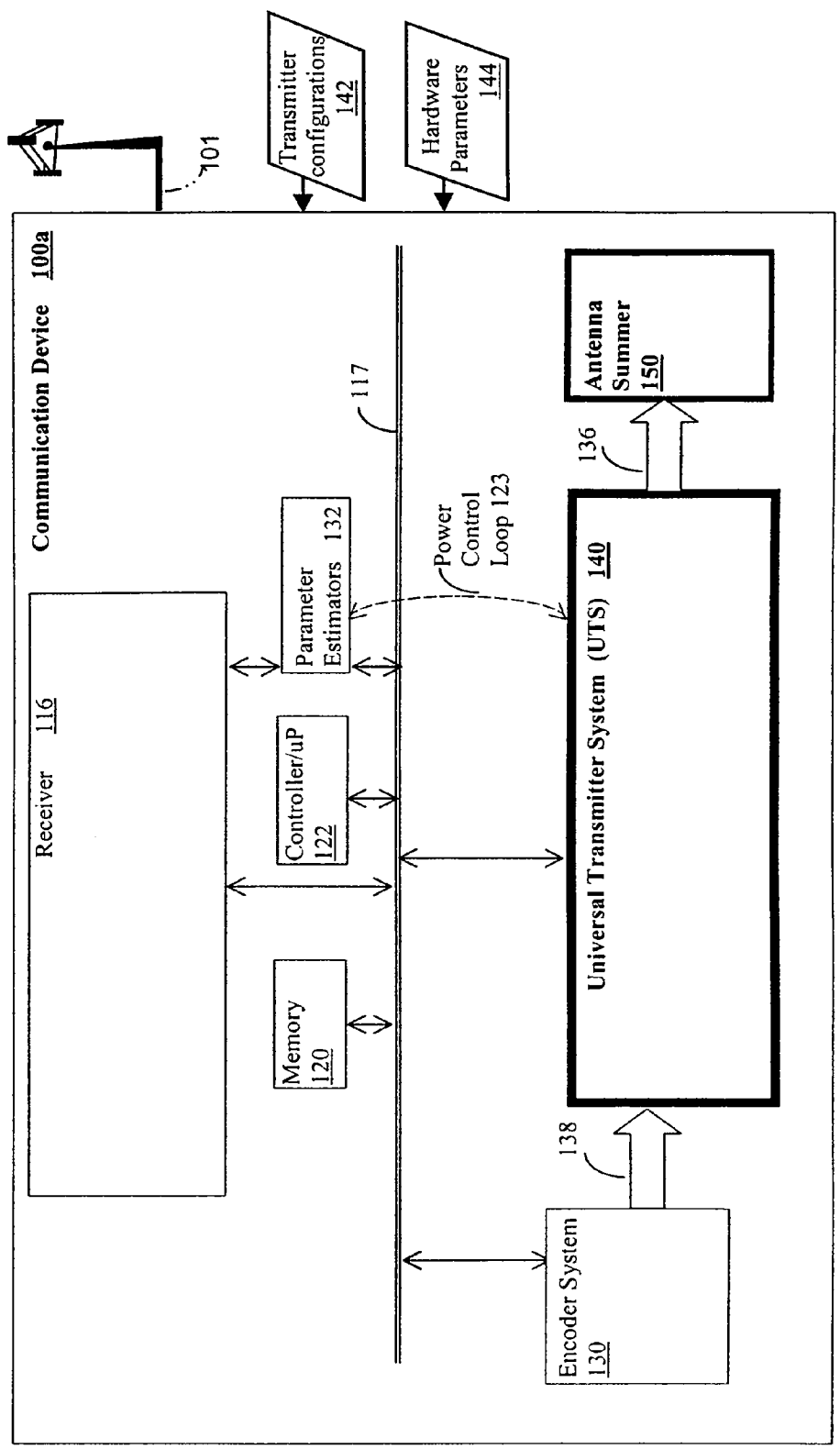
FIG. 1A is a block diagram of an electronic communication device with a universal transmitter system (UTS) and antenna summer, in accordance with one embodiment of the present invention.

Reference will now be made in detail to the preferred embodiments of the invention. Examples of the preferred embodiment are illustrated in the accompanying drawings. While the invention will be described in conjunction with the preferred embodiments, it is understood that they are not intended to limit the invention to these embodiments. Rather, the invention is intended to cover alternatives, modifications and equivalents, which may be included within the spirit and scope of the invention, as defined by the appended claims. Additionally, in the following detailed description of the present invention, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the present invention.

The present invention can be implemented in a wide variety of communication systems, including digital direct sequence spread-spectrum (DSSS) wireless communication systems or techniques that utilize code sequences as well as TDMA and OFDM systems in both wired and wireless applications, with little or no modification. The systems or techniques which utilize transmitter resources include, but are not limited to, fixed wireless, unlicensed Federal Communications Commission (FCC) wireless systems, wireless local area network (W-LAN), cordless telephony, cellular telephony, personal base station, telemetry, modems, and other digital data processing applications. The present invention can be applied to both transmitters, e.g., a base station, and to receivers, e.g., a terminal, for fixed wireless, W-LAN, cellular telephony, and personal base station applications, or any device that transmits information.

In particular, the present invention is applicable to the following exemplary list of digital applications. One fixed wireless application to which the present invention may be applied is a metropolitan multipoint distribution system (MMDS). Examples include wireless cable broadcast, or two-way wireless local loop (WLL) systems. Some examples of a W-LAN, that can communicates digitized audio and data packets, for which the present invention can be applied, include Open Air and the Institute of Electrical and Electronics Engineers (IEEE) specification 802.11b. In yet another application, a specific example of an unlicensed FCC application to which the present invention may be applied include the Industrial, Scientific, and Medical band (ISM) devices, which can include cordless telephony products. Personal base stations can utilize either cordless or cellular telephony wireless communication standards. Lastly, the cellular telephony systems in which the present invention can be applied includes, but is not limited to, IS-95, IS2000, ARIB, 3GPP-FDD, 3GPP-TDD, 3GPP2, 1EXTREME, or other user-defined protocols.

Communication Device

Referring now to FIG. 1A, a block diagram of an electronic communication device with a configurable universal transmitter system (UTS) is shown in accordance with one embodiment of the present invention. Electronic communication device 100a provides an exemplary application of the present invention in a wireless direct sequence spread spectrum (DSSS) base transceiver station (BTS).

Communication device 100a includes a receiver block 116. Receiver block 116 includes front-end processing components and base band processing components known to those skilled in the art. Communication device also includes parameter estimator 132, which provides channel estimates on frequency, phase, gain, etc. that are useful by the receiver processor to recover data, as is know by those skilled in the art. Communication device 100a includes an encoder system 130, a UTS 140, and an antenna summer 150, coupled to each other in series. Communication device 100a also includes a microprocessor (uP), or controller, 122 and a memory block 120, also referred to as a host processor and host memory, respectively, that are coupled to UTS 140, encoder system 130, antenna summer 150, receiver 116 and parameter estimators 132 via bus 117. Host processor 122 and host memory 130 support the management and exchange of data and/or instructions to the various components of communication device 100a. Encoder 130 can be any type of encoder, such as a Viterbi decoder or a Turbo decoder, both of which are know by those skilled in the art. Encoder is coupled to UTS via interconnect 138 while UTS is coupled to antenna summer via interconnect 136. In another embodiment, there is no encoder system for a given communication protocol, e.g., TDMA.

Inputs of transmitter configuration 142 and hardware parameters 144 are provided to communication device from an external source such as a workstation. Transmitter configuration 142 and hardware parameters 144 are provided to UTS 140 and antenna summer 150 via controller 122 in the present embodiment. By allowing external configuration control of UTS 140 and antenna summer 150, the present invention provides flexibility of transmitting resources over time as standards and algorithms for transmitting data evolve.

Hardware resources of communication device 100a, e.g., components in receiver 116 and UTS 140, are applied to a single computation process, e.g., a given channel, in one embodiment. However, in another embodiment, these hardware resources can be enhanced by running them at a clock rate higher than that required by a process, e.g., higher than the data rate for a communication protocol implemented on communication device 100a. In this manner, resources of individual computation components, a receiver processor, can be time-shared across multiple computation processes, e.g., several multipaths and/or multiple channels. Additional information on the design and implementation of configurations into a configurable communication device is provided in co-pending U.S. patent application Ser. No. 09/492,634 entitled "IMPROVED APPARATUS AND METHOD FOR MULTI-THREADED SIGNAL PROCESSING" by Subramanian et al., attorney docket number MORP-P002. This related application is commonly assigned, and is hereby incorporated by reference.

Communication system 100a provides an exemplary embodiment of the present invention, which is well suited to alternative embodiments. For example, in other embodiments, communication system 100a is a mobile handset user equipment (UE), a test platform, an embedded modem, or other communication device in another code-dependent application. A three-sector antenna array 101 is shown for illustrative purposes only in the present embodiment. Any kind of antenna system can be used with the present invention.

Figure 1B:
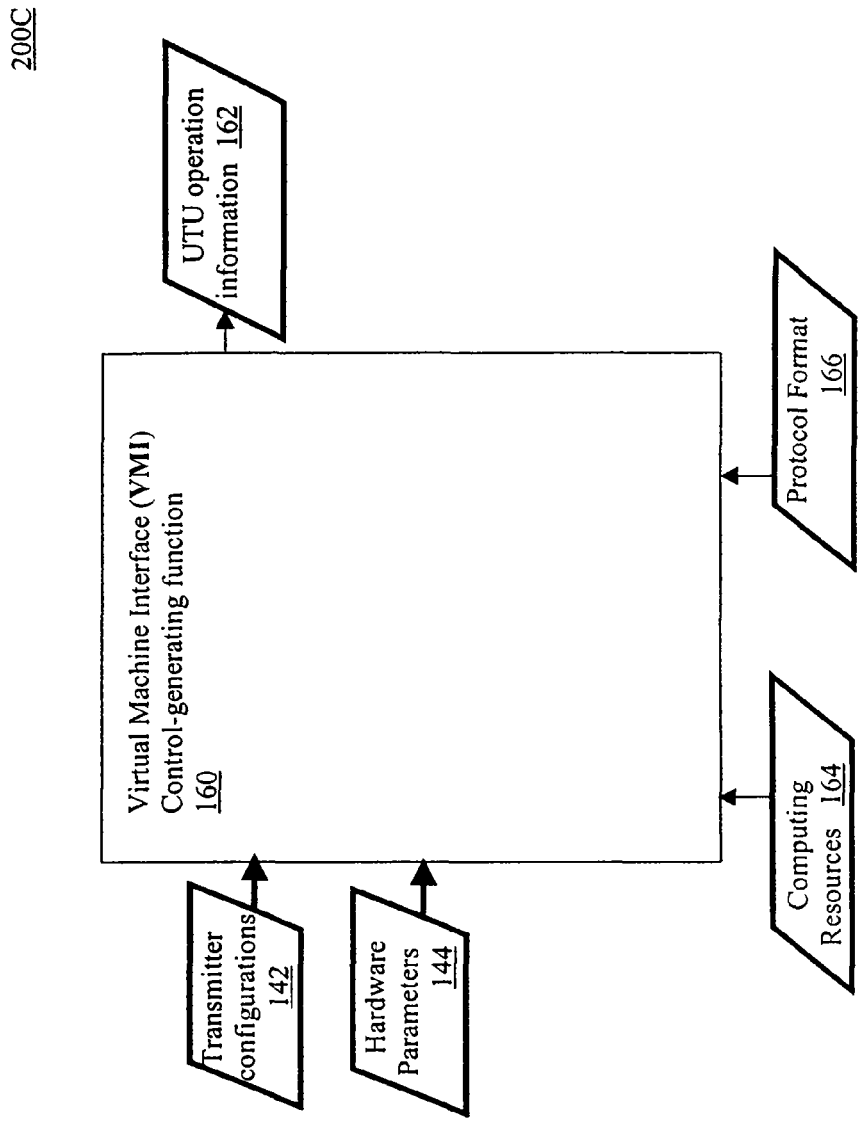
FIG. 1B is a block diagram of the virtual machine interface (VMI) function provided by the electronic communication device for the transmitter, in accordance with one embodiment of the present invention.

Referring now to FIG. 1B a block diagram of the virtual machine interface (VMI) function provided by the electronic communication device for the transmitter, in accordance with one embodiment of the present invention. The VMI is useful in translating the transmitter configuration input 142 into control register information output for discrete devices in configurable UTS 140.

VMI function block 160 receives inputs of transmitter configurations 142 and hardware parameters 144, in conjunction with computer resources input 164 and protocol format 166. VMI function block 160 translates this input into a UTU operating information output 162, e.g., control register information, which is subsequently communicated to the transmitter resources as described more fully hereinafter. Computer resources input 164 provides the software that is tailored to the specific commands and instructions utilized of the host microprocessor 122. Protocol format input 166 includes information regarding how host processor 122 communicates internally, e.g., RISC based, and with the balance of the communication device.

VMI function block 160 is implemented in the present embodiment using host memory 120 and host controller 122 of communication device 100a. Software for resident on local communication device, as stored in memory 120 and executed on controller uP 122. The VMI function block 160 allows an external user to see only functions and high-level resources of the UTS 140. In this manner, it is easier to generate a configuration, download the configuration information and to implement the configuration on the UTS 140. More information on the VMI is provided in co-pending application Ser. No. 09/828,381 entitled "VIRTUAL MACHINE INTERFACE AND APPLICATION PROGRAMMING INTERFACE FOR RECONFIGURABLE AND SOFTWARE PROGRAMMABLE PROCESSOR" by Woodthorpe et al., filed Apr. 5, 2001. While present invention provides a VMI to interface the configuration input 142 with the configurable device, UTS 140, the present invention is well suited to not using a VMI and instead receiving configuration information that is suitable for control register implementation.

Universal Transmitter System

Figure 2A:
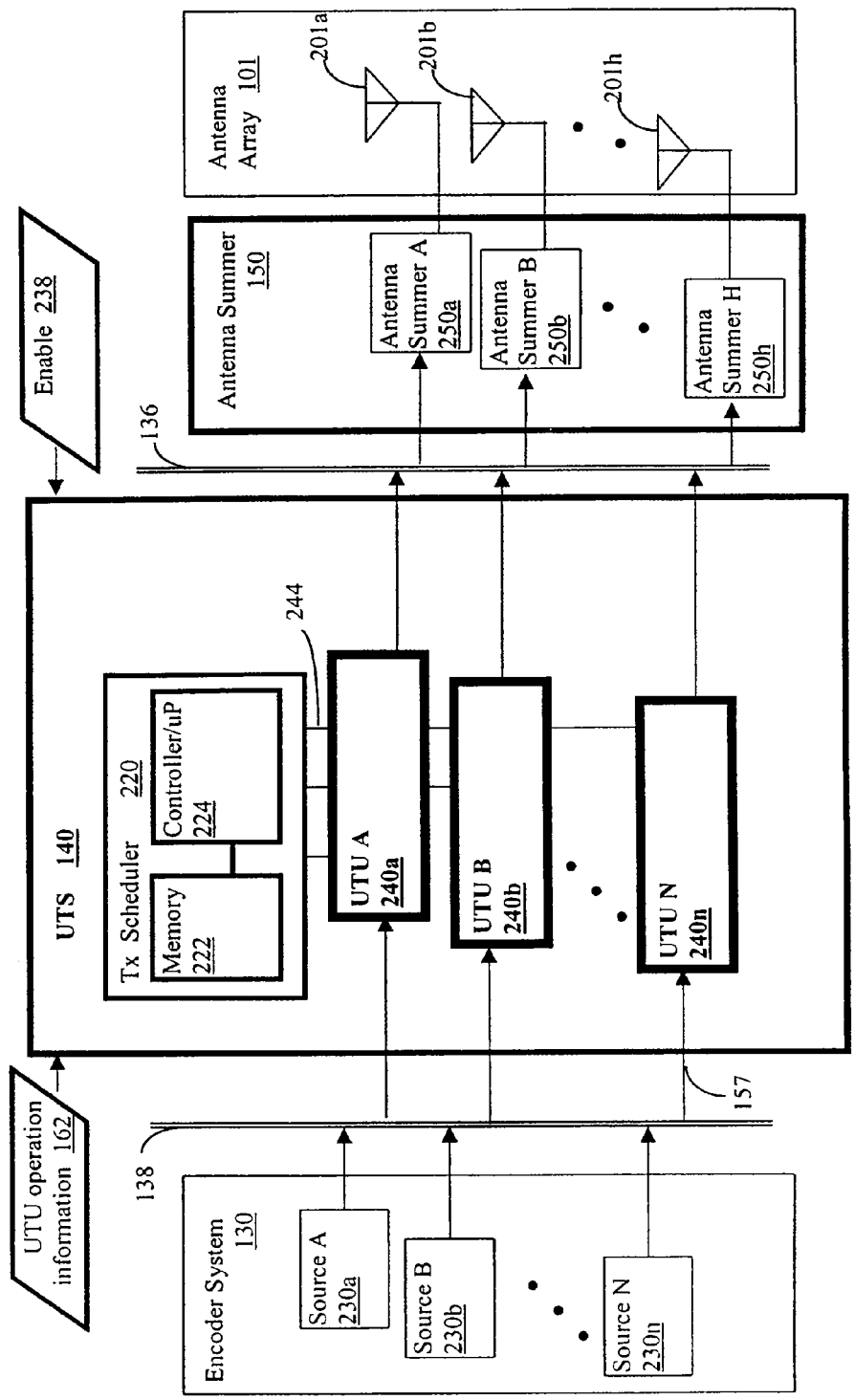
FIG. 2A is a block diagram a universal transmitter system and the antenna summer, in accordance with one embodiment of the present invention.

Referring now to FIG. 2A, a block diagram of a universal transmitter system and the antenna summer is shown, in accordance with one embodiment of the present invention. FIG. 2A provides an exemplary description of components of universal transmitter system 140 in communication device 100a of FIG. 1A. FIG. 2A also provides an exemplary embodiment of interconnects 136 and 138 of FIG. 1A.

Encoder system 130 from FIG. 1A is shown in the present figure to illustrate the connectivity between components. Encoder system 130 is coupled to universal transmitter system (UTS) via bus 138. Encoder system 130 includes multiple resources, source A 230a, source B 230b, through source N 230, which an be memory buffers or a partitioned single memory buffer. UTS 140 is coupled to antenna summer 150 via a bus 136. Antennae summer 150 is subsequently coupled to antennae array 101 with a one to one link between antenna summer blocks A 250a through H 250h and antenna 201a through 201h, respectively. Additional components typically used in a communication device, such as a pulse shape filter, a digital to analog (DA) converter, and a radio transmitter, are not shown between antenna summer block 150a and antenna array 101 for purposes of clarity.

Transmit (Tx) scheduler 220 is coupled in parallel to multiple universal transmitter units (UTUs), UTU A 240a through UTU N 240n, where N is an arbitrary number of units as desired for a given application. In the present embodiment, Tx scheduler 220 is a software-based controller that controls hardware resources. Tx scheduler 220 can be dynamically changed and is flexible. The value for 'N' transmitters is an arbitrary quantity of physical hardware resources, as designed for a given application, e.g., source N 230n and transmitter N 240n, as provided in FIG. 2A. In the present embodiment, the value N is the same for both source 230n and UTU 240N. By having the same quantity, these interfacing devices can have a one to one correspondence thereby allowing complementary operation, controlling, and resource allocation. However, in another embodiment, the quantity of devices can be different for source N 230N and UTU N 240N. For example, an additional quantity of a physical hardware resource can be provided for a given function, e.g., transmitters, if known to have a higher failure rate than a matching component, e.g., sources. In this manner, an extra reserve of physical resources can be utilized to maintain nominal performance of the communication device despite ongoing local failures. By changing which physical resources are scheduled, as described in subsequent FIG. 2D, reserve resources can be idle or implemented.

The value of 'N' in the present embodiment in terms of real hardware transmitters is less than the cumulative number of transmitters required by all the antennae in the antenna array 101. In the present embodiment, the number of physical UTU components, e.g., UTU A 240a through UTU N 240n, is equivalent to a worst case, e.g., highest quantity, of transmitters required for a single antenna for a worst case of communication protocols to which the communication device is configurable to operate. The resultant worst-case value might also account for the heaviest traffic sector in a base station. In another embodiment, the worst-case scenario also includes a buffer of additional transmitters to accommodate future growth in standards. However, the present invention is well suited to having any quantity of physical transmitters as designed by a user. The allocation of transmitter resources for the balance of the antenna in the antenna array 101 are accommodated by time-slicing, or reusing, the physical transmitter resources multiple times within a given system cycle, once for each antenna. This concept is explained more fully in subsequent FIGS. 2C and 2D.

The value for 'H' antenna summers and antennae is similarly an arbitrary quantity of resources, either real or virtual, as designed for a given application for some components, e.g., antenna summer H 250h and antenna H 201h. The quantity of 'H' for antenna summer H 250h and antenna H 201h is the same in the present embodiment because there is a one to one correspondence between the summer and the antenna to which it provides data. However, in another embodiment, the quantity of devices can be different for antenna summer H 250h and antenna H 201h. The value H is less than N in the present embodiment because multiple users are transmitted on a single antenna. However, the specific ratio of 'H' and 'N' can vary widely as defined by a given application.

A real resource is a physical piece of hardware. In contrast a virtual resource is a time-sliced version of the real hardware that can be utilized in a context independent of other time-sliced versions of the real hardware. Thus, for all practical purposes the virtual resources exist and are dedicated to appropriate interfacing devices for the time period allocated.

Tx Scheduler 220 includes a memory 222 coupled to a controller or microprocessor (uP) 224 that is dedicated to the control of hardware resources in UTS 140 and interfacing with other components in communication device 100a. Memory 222 and controller 224 set is a lower hierarchical level than host memory 120 and host controller 122 provided on the host communication device 100a in FIG. 1A. Tx Scheduler 220 is secondary to the host uP 122 in the present embodiment. This means that Tx scheduler 220 operates as initiated, and controlled thereafter, by host uP 122. Thus, Tx scheduler avoids most interruptions of host uP 122 thereby providing more efficient and reliable operation of communication device 100a.

Antenna array 101 includes multiple individual antennas or antennae, e.g., Antenna 201a through antenna 201h. The present invention is well suited to having as little as one antenna, e.g., on a mobile communication device such as a cellular phone. Multiple antennae can be utilized for a multiple input multiple output (MIMO) application for a communication device in which a data signal is transmitted on multiple antennae. Alternatively, the present invention is well suited to non-diversity antenna and diversity antenna transmissions. Components and function of UTUs 240a through 240n are provided in subsequent figures.

Bus 138 and 136 use shared bus architecture. A shared bus implies that data is sent and received in a serial fashion. In order to accommodate the real time concurrent operation of multiple users having multiple channels, the present invention operates resources at higher speeds and caches data in order to complete all the parallel processing within the required system cycle time. More detail on this subject is provided in subsequent paragraphs. Use of bus 138 allows any routing between encoder system 130 components such as source A 230a through source N 230N to any resource in UTS 140, such as UTU A 240a through UTU N 240n. Similarly, bus 136 allows any routing between any resource in UTS 140, such as UTU A 240a through UTU N 240n with any resource in antenna summer 150a, such as antenna summer 250a through antenna summer H 250h. In this manner, the present invention avoids the cost, complexity, and unreliability of conventional linking mechanisms such as a crossbar switch. Bus 138 provides coupling for real data while bus 136 and its coupling components are designed to handle both real and complex data.

Input of control field configuration 161, and enable signal 238 is provided by the host memory 120 and controller 122 of FIG. 1A. Control field configuration and enable signal are in machine language and implemented either in hardware components of UTS 140, such as UTU A 240a, or in software based operation, e.g., memory 222. Control field configuration input 161 includes a list of a wide range of possible channel formats. In the present embodiment, all channel formats for multiple communication protocols is downloaded to be stored in memory 222, for subsequent access by controller 224 and provision to individual UTUs to characterize them for a specific need of input data. Examples of downlink channel types for 3GPP for one communication protocol include a common pilot channel (CPCH), a primary common control physical channel (PCCPCH), a secondary common control physical channel (SCCPCH), a synchronization channel (SCH), a downlink shared channel (DSCH), an acquisition indicator channel (MCH), a CPCH access preamble acquisition indicator channel (AP-AICH), a CPCH collision detection/channel assignment indicator channel (CD/CA-ICH), a CPCH status indicator channel (CSICH), a paging indicator channel (PICH), and a dedicated channel (DCH).

By having a local scheduler, transmitter resources of UTS 140 can be operated somewhat autonomously from host processor 122 and memory 120, thereby freeing up resources. Additionally, bus system 136 allows the use of any quantity of antennae in any coupling arrangement, including diversity transmission and MIMO operation. Thus, an antennae array may be switched between two quantities of antenna, while using the same antenna summer 150a, universal transmitter system 140, and bus interface 138 and 136 of the present invention, assuming that sufficient antenna summers existed.

Tx Scheduler 220 includes other interfaces and components known by those skilled in the art such as a clock interface, power interface, etc. which are not included in FIG. 2A for purposes of clarity. In lieu of bus 138, UTS 140 can be coupled to encoder system 130 using hard wiring and a conventional crossbar switch can be used in lieu of bus 136. The resulting system would still benefit from the flexibility of UTS 140. If multiple modem engines are utilized to transmit information to an antenna array 101, then an additional block of summer blocks could exist external to a modem engine for combining the outputs from multiple modem engines and relaying the results to antenna array 101.

Figure 2B:
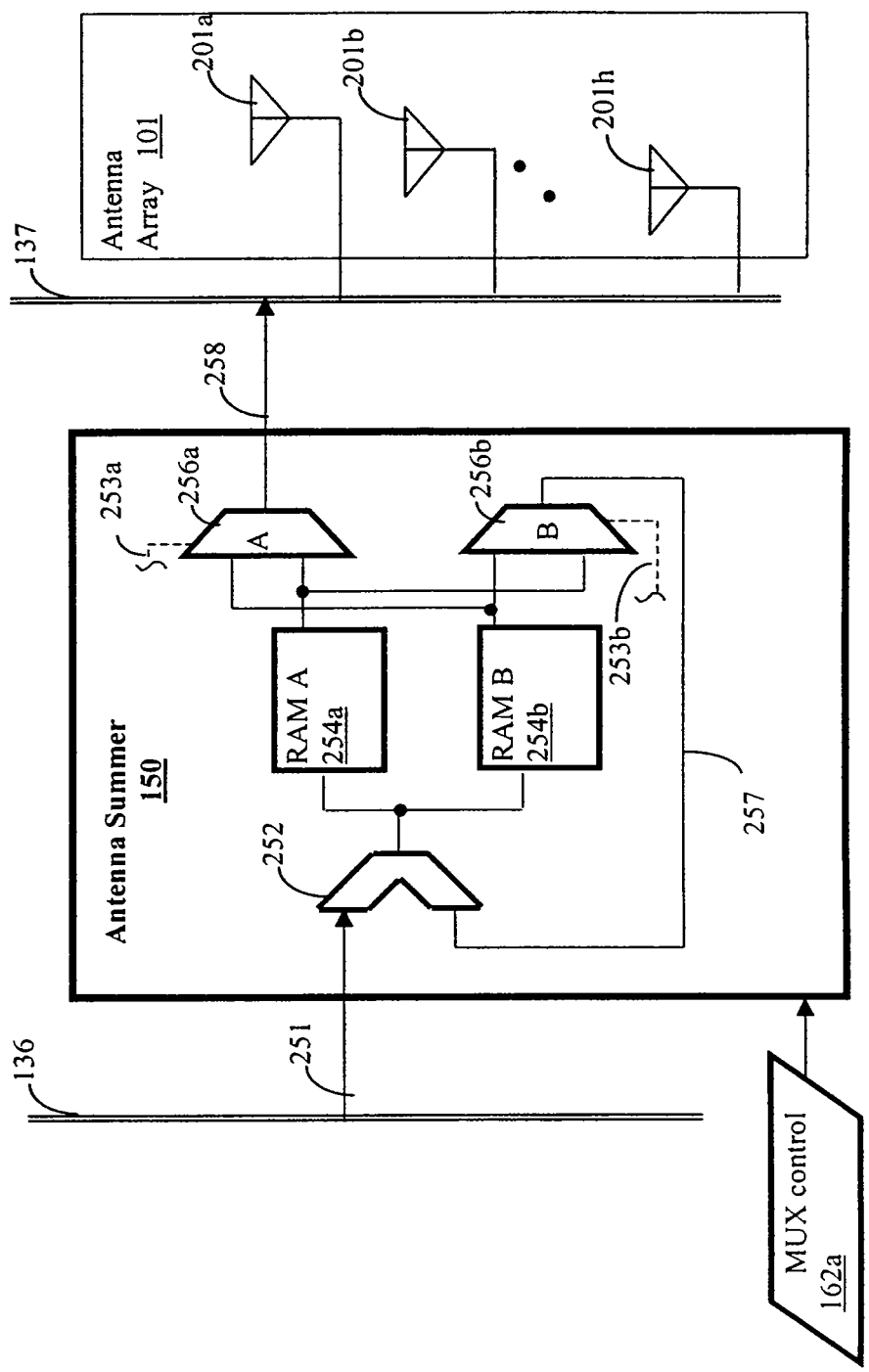
FIG. 2B is a block diagram of an alternative antenna summer, in accordance with one embodiment of the present invention.

Referring now to FIG. 2B, a block diagram of an alternative antenna summer is shown, in accordance with one embodiment of the present invention. Antenna summer 150b provides an alternative antenna summer configuration that may simply be substituted into the adjacent components, such as UTS 140, in FIG. 2A. The configuration of antenna summer 150b can be referred to as a dual memory buffer, or a so-called ping-pong memory buffer.

Antenna summer 150b includes an accumulator 252 memory (RAM) A 254a and RAM B 254b, and two multiplexers, MUX A 256a and MUX B 256b. Adder 252 has an output coupled to both random access memory devices RAM A 254a and RAM B 254b in parallel. Output lines from RAM A 254a and RAM B 254b are both coupled to MUX A 256a and to MUX B 256b in parallel. An output line 257 from MUX B is coupled to adder 252 as a feedback loop to allow accumulation of data from single input line 251 from bus 136. A single output line 258 from MUX A 256a is coupled to bus 137. MUX A has control line 253a while MUX B 256b has control line 253b. RAM A 254a and RAM B 254b are sufficiently large to accept accumulated outputs over multiple virtual use cycles of the physical hardware in the present embodiment.

Mux control input 162a is provided to antenna summer 150 and to MUX A and MUX B on control lines 253a and 253b respectively. Mux control input 162a is one of the outputs for UTU operating information 162 provided by VMI function 160 of FIG. 1B. The MUX control dictates which RAM device is communicating data out from antenna summer 150 to one of the antenna, e.g., 201a through 201h, in antenna array 101. Similarly, control lines 253a and 253b control which RAM device is accumulating data into antenna summer 150 from encoder system 130.

By using a dual memory buffer, a significant amount of power and chip area can be saved over the alternative antenna summer embodiment 150a shown in FIG. 2A. For example, if a communication device has six (6) antennae then antennae summer 150a would utilize six (6) antenna summers. In contrast, antenna summer 150b would use the same number of components, e.g., a single adder, and two (2) memory buffers as shown in FIG. 2B.

The configuration of antenna summer 150b has an additional benefit over the configuration of antenna summer 150a. Importantly, any quantity of antenna, e.g., antennae A 201a through antenna H 201h, may be used in antenna array 101 interfacing alternative configuration antenna summer 150b. Effectively, only software changes in Tx Scheduler 220 and in control software in host memory 120 are needed to accommodate the change in the quantity of antenna with which the UTS 140 will interface. This is because there is no 1:1 restriction in antenna summers and antenna with antenna summer 150b. Any allocation of antenna summers to an antenna assumes that saturation levels are not exceeded for the antenna. Additionally, the sequence antenna receiving data from antenna summer block 150b is easily controlled by modifying primary table list 280a of FIG. 2D. Antenna summer block 150b essentially provides information to antenna 201a through 201h in antenna array 101 in a serial manner.

RAM A 270a and RAM B 270b may be separate memory devices or may be partitioned areas of a single memory device, as known by those skilled in the art. In this case, the memory would be a multi-ported device capable of reading data and writing data simultaneously.

Figure 2C:
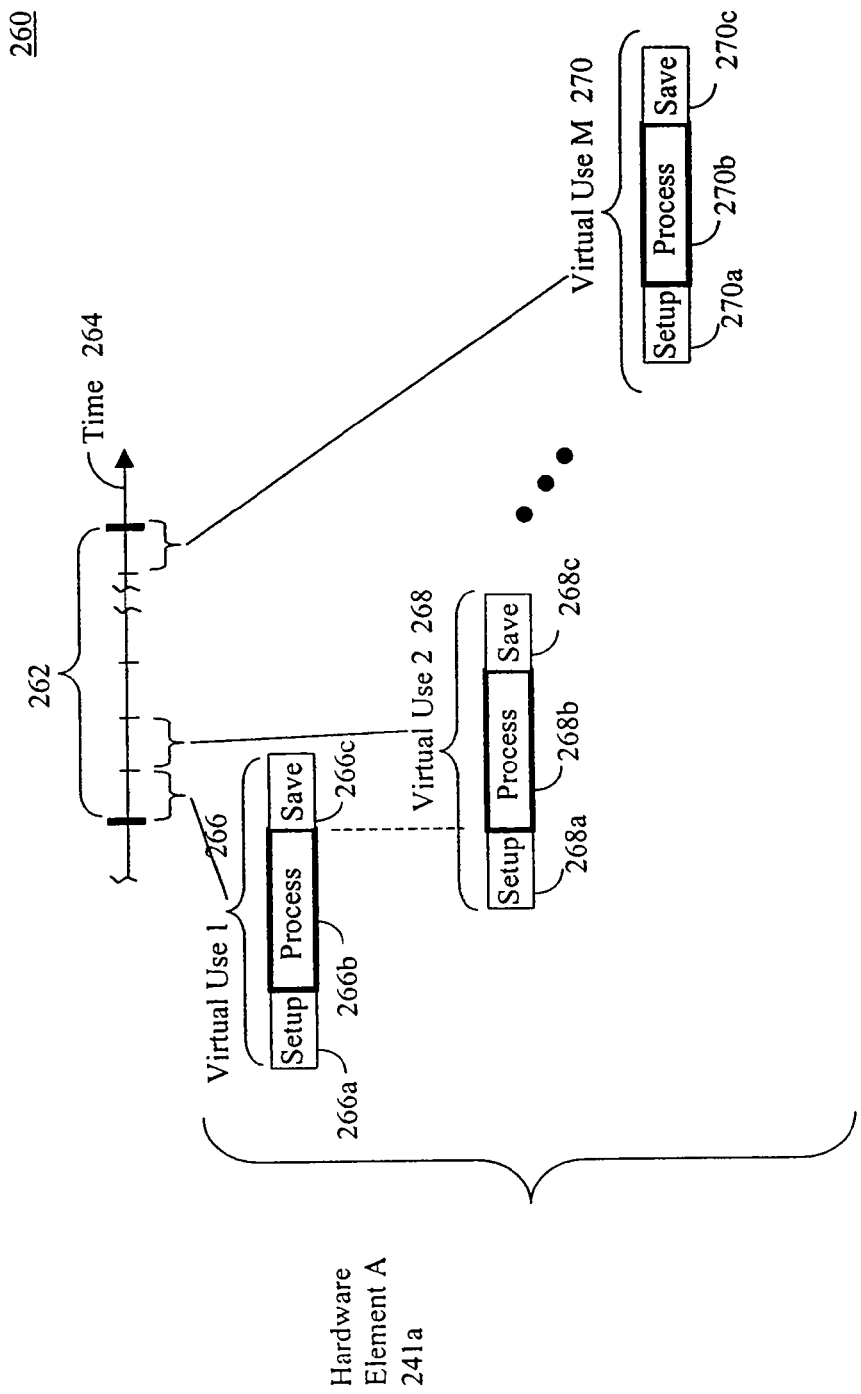
FIG. 2C is a graph of multiple processing cycles that reuse a universal transmitter unit within a given system cycle, in accordance with one embodiment of the present invention.

Referring now to FIG. 2C, a graph of multiple processing cycles that reuse a universal transmitter unit within a given system cycle is shown, in accordance with one embodiment of the present invention. Graph 260 provides one embodiment of implementing Tx scheduler 220, to control hardware resources, e.g., UTU units 240a through 240n, multiple times, e.g., virtual use 1 266 through virtual use M 270, within a given system cycle 262.

System cycle 262 is defined by a given application. For example, in a 3GPP protocol, a system cycle is a field having 256 chips. However, the present invention is well suited to any length of system cycle that is defined by any variable, e.g., time, quantity of data, occurrence of events, etc. Each of the multiple virtual uses, 266, and 268 through 270 of a physical resource within a given cycle can be referred to as a virtual resource. Hardware element A 241a is a physical UTU, e.g., 240a of FIG. 2A in the present embodiment. Multiple hardware elements can be initiated in series and operated in parallel using the time-sliced process. Multiple processing steps shown range from virtual use 1 266 through virtual use M 270 of hardware element A, where M is any value. By necessity, the clock speed of the hardware resources is relative to the system cycle and the number of intended uses, along with overhead and latency conditions. In equation form, this relationship is expressed as:

$$\text{UTU Clock Freq} = (\text{System Clock Frequency}) \times (M \text{ uses}) \quad \text{Equation [2]}$$

The present invention provides concurrent processing with a limited quantity of hardware to achieve a scale of efficiency, as shown in the present embodiment. The present invention does so by running the clock speed faster and reusing hardware as the system is operating, thereby giving the appearance that each virtual use includes a setup stage 266a, a process stage 266b and a save stage 266c. In the present embodiment, the setup stage of one use overlaps in time, that is to say it operates in parallel, to a processing stage of another use. In this manner, the processing stages of sequential uses can be aligned to provide maximum processing use of hardware resources. The total number of virtual resources of all hardware elements is M uses, of FIG. 2C times N elements of UTU resources, e.g., UTU N 240n of FIG. 2A. In equation form, this relationship is expressed as:

$$\text{Quantity of UTU Resources} = (M \text{ uses}) \times (N \text{ hardware resources}) \quad \text{Equation [1]}$$

By reusing hardware, a given system can be tailored to individual needs by scaling the clock rate and thereby the virtual resources created by the multiple processing cycles with a given system cycle. M can be any value for a given application. The greater the number of virtual resources required, the higher a clock rate for the resource can be scaled. Because each virtual use is completed within a given system cycle, they appear to be performed in parallel as concurrent operations, though only a single hardware resource is used.

Additional information on time-sharing of hardware resources is described in co-pending U.S. patent application Ser. No. 09/920,093 entitled "METHOD AND APPARATUS FOR TIME-SLICED AND MULTI-THREADED DATA PROCESSING IN A COMMUNICATION SYSTEM," by Rieken et al., This related application is commonly assigned, and is hereby incorporated by reference. Alternatively, the present invention is well suited to using any quantity of virtual uses for any time period desired, for any hardware element and for any system cycle condition. The number of virtual uses for a given application can change over the period of time, providing control information and management software provides support for dynamic changes to the frequency at which the hardware resources operate. Furthermore, alignment of processing, setup, and save stages can have a wide range of alignment features, overlapping, no overlapping, staggered, etc. as appropriate for a given application. The quantity of virtual uses does not have to consume the entire system cycle, 262. For example, a wait feature can be implemented to hold the processing of virtual hardware resources until the next system cycle when new data will be available.

Figure 2D:
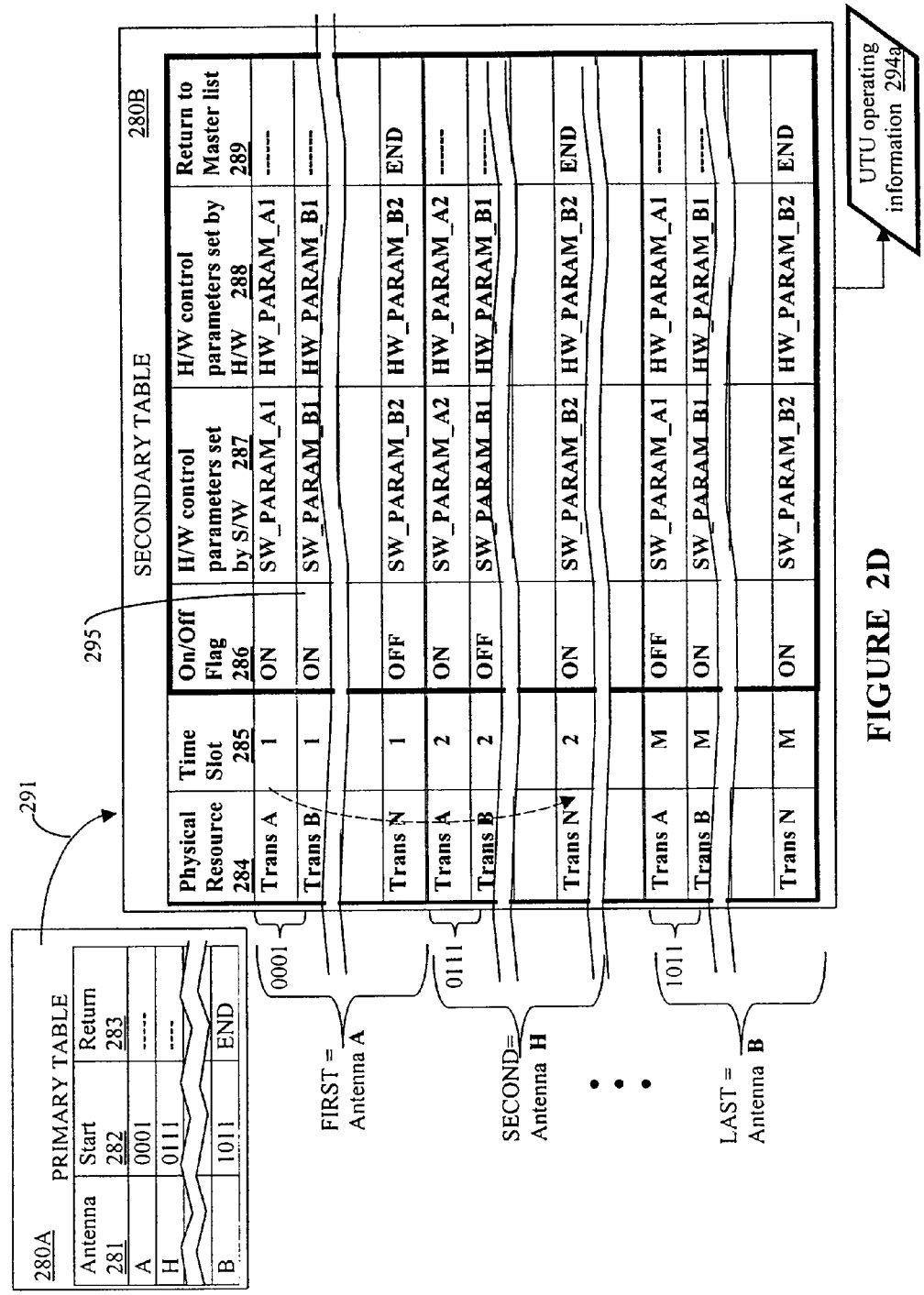
FIG. 2D is a table of data for dynamically scheduling and configuring a universal transmitter system, in accordance with one embodiment of the present invention. (Scheduler=memory plus controller plus this table.)

Referring now to FIG. 2D, a table of data for Dynamically scheduling and configuring a universal transmitter system is shown, in accordance with one embodiment of the present invention. Table 2D is utilized to control the reuse of hardware components within a system clock cycle as shown in FIG. 2C.

The present embodiment utilizes a primary table (or master link list) 280a and secondary table (or secondary link list) 280b of executable software code that provides a flexible and dynamically configurable sequential controller functions for electronic hardware resources, e.g., UTU 240a through 240n. The combination of the primary table 280a and secondary table 280b provides a hierarchy of controllers that execute lines of code in a complementary fashion. Primary table 280a includes a column designating antenna ID 281, and return column 283 that provides a loop by linking the last entry in primary table to the first entry.

The data in tables 280a and 280b is stored in memory, e.g., local memory 222 of Tx scheduler 220, and executed on hardware controller 224, of FIG. 2A (collectively referred to as a scheduler, an allocator, or a link list software controller) in that it schedules and/or configures and/or controls and/or allocates virtual hardware resources over time for processing data for specified users, e.g., on appropriate channels according to selected protocol requirements.

Primary table 280a provides the antenna sequence to which the hardware resources, e.g., transmitters, are dedicated for a given time slice, or time slot, within a system cycle. Within a single system cycle, virtual transmitter resources will have addressed data for all antennae in antenna array 101. Primary table 280a transfers control to the secondary table 280b as indicated by arrow 291.

Secondary table 280b then provides operating information, via output 294a, to the hardware resources, e.g., the UTUs 240a through 240n, and enables them to process data for the given antenna designated by primary table 280a. The group of rows, or slots, of information for each given physical resource/virtual use combination for a given antenna, e.g., all rows for virtual use '1' in column 285 designated for antenna A, can be referred to as a chunk list. Every line of code is executed sequentially within the chunk list for a given antenna, assuming that it has an on/off flag set to 'on' in column 286, until it reaches the last line, wherein the return to primary list column 289 has an 'end' that essentially provides a pointer back to the primary table 280a, as shown by arrow 292, to which it returns control. Secondary table also contains information for how large the data or pilot fields are for a channel format by providing a lookup address of a desired channel format, e.g., slot format, in a look up table (LUT) in memory 222. A flowchart describing the operation of primary table 280a and secondary table 280b is provided in subsequent FIG. 5C.

Control is provided to primary list 280A via enable input 238 shown in FIG. 2A. Control field configuration 161 is similarly provided and loaded into primary list 'start' column 282 and into secondary list for 'Hardware (H/W) control parameters set by software (S/W)' column 287. Examples of H/W control parameters set by S/W include the slot format, spreading factor configuration for a code generator, modulation formatting, discontinuous transmission (DTX) rates, frame assembly instructions, etc. and any other variable that would exist across multiple communication protocols accommodated by the universal transmitter system 140. Another user-specified input can include a min/max limit for power control for various channel types. Some of these parameters and configurations are dictated by the communication protocol, and thus change the configurable multi-protocol capable universal transmitter unit into a channel-specific transmitter when implemented. Other parameters and configurations are algorithmic or performance specific values that enable the universal transmitter unit to perform to a user's model. The slot format parameter indicates the type of channel that the data from the encoder system is to be transmitted as.

Hardware control parameters set by hardware include inputs such as power control loop input, e.g., input 123 shown in FIG. 1A, state information from a previous time slice for a given channel, timing information, updates to power control from uplink, etc. These parameters are obtained from operation of the communication device on data for a given user or mobile. Operation of schedulers as well as the link lists is also described in a co-pending U.S. patent application Ser. No. 09/922,484, entitled 'METHOD AND APPARATUS FOR SOFTWARE-BASED ALLOCATION AND SCHEDULING OF HARDWARE RESOURCES IN AN ELECTRONIC DEVICE", by Kavoori et al., filed concurrently herewith. This related application is commonly assigned, and is hereby incorporated by reference. The benefits of the software controller include flexible sequencing of hardware resources, convenient reconfigurability of hardware via configuration information stored in software, easy debugging, high failure tolerance, etc.

The present invention is well suited to alternatives from the embodiments provided in FIG. 2D. For example, a link list, or secondary table 280B, located in memory can have software that controls the linking address of the next executable control instruction on a line-by-line basis rather than having a chunk list that automatically sequentially steps through every control instruction in the group of control lines slated for a given antenna. This alternative requires more steps and overhead, but provides significantly more control over discretely sequencing the hardware. In another embodiment, host memory 120 and host controller 122 of FIG. 1A can be utilized to implement the primary table 280a and/or the secondary table 280b. However, this alternative would burden the host system, e.g., communication device 100a and cause the overall communication device to be less efficient. Even if hardware resources are not utilized in a time-slice manner, as described in FIG. 2C, link lists 280a and 280b can still be utilizes to flexibly control the hardware resources, e.g., UTU resources. Furthermore, various portions of software control can be provided by hard coding, e.g., power control loop input to the universal transmitter unit. Some configurabiltiy features can be hard coded in another embodiment, thereby reducing the scope of application for the UTU, and hence the communication device. However, the benefit of having a dynamically flexible software controller can still be realized in these different embodiments of control and configurabiltiy. In lieu of utilizing a table in memory to execute control register information for UTU, the following applications can be used: 1) a digital signal processor (DSP) can be utilized for TX scheduler 220 with addresses in memory that provide parameter information; 2) a software program can be utilized with all the parameters hard coded as part of the program; or 3) burst engines with controls, e.g., microcode, provided for boundaries and start times for edges or bursts.

Universal Transmitter Unit

Figure 3A:
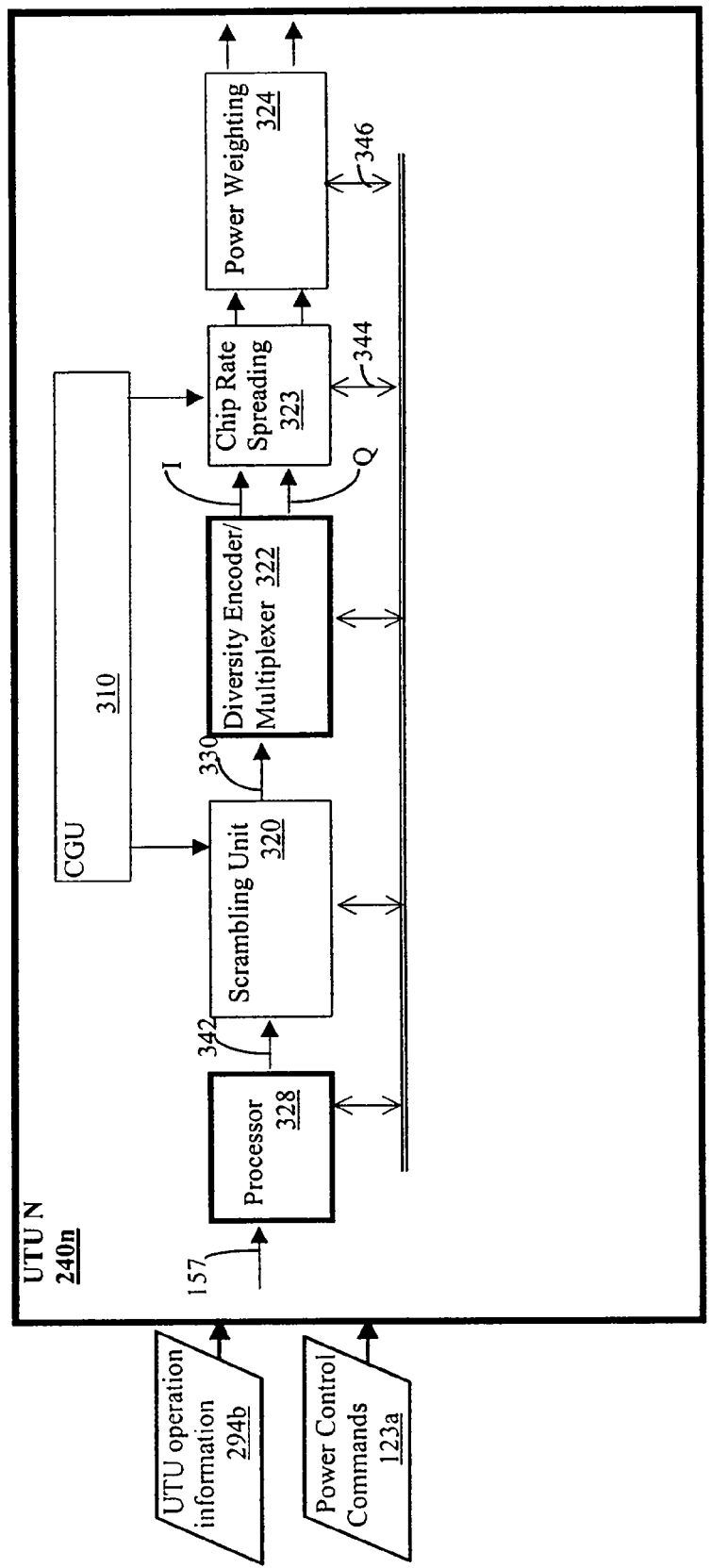
FIG. 3A is a block diagram of a universal transmitter unit, in accordance with one embodiment of the present invention.

Referring now to FIG. 3A, a block diagram of a universal transmitter unit, in accordance with one embodiment of the present invention. Universal transmitter unit 240n in FIG. 3A provides an exemplary embodiment of any of UTU components 240a through 240n for UTS 140 of FIG. 2A.

UTU N 240n includes a processor 328, a symbol rate scrambling block 320, a code generator unit (CGU) 310, a demux and diversity block 322, a chip-rate spreading block 323, and a power-weighting block 324. CGU 310 is coupled to scrambling block and to chip rate-spreading block 323 to provide code sequences that are appropriate to the communication protocol desired and to the specific channel within the communication protocol. CGU 310 is a configurable code generator capable of performing any one of multiple code sequences required by any one of multiple communication protocols. An exemplary CGU is provided by U.S. patent application Ser. No. 09/751,782 entitled "A CONFIGURABLE CODE GENERATOR SYSTEM FOR SPREAD SPECTRUM APPLICATIONS", by Joel Medlock, attorney docket number 9824-0029-999. This related application is commonly assigned, and is hereby incorporated by reference. Alternatively CGU 310 can be a code engine slated for a single communication protocol if communication device 100a is desired to be operated as a single protocol device. Alternatively, CGU 310 can be a collection of independent code generators capable of performing the range of code sequence generation required by the multiple communication protocols desired for the communication device 100a.

Input data is received on input line 157, as shown in FIG. 2A, and communicated to processor 328. Processor performs protocol assembler functions as described in a subsequent figure, then passes data to scrambling unit 320.

Scrambling block 320 performs a multiplication operation with a scrambling code as is well known by those skilled in the art. Because chip rate spreading block 323 can spread received data with any spreading sequence it receives, it is configurable to any one of the multiple communication protocols for which CGU 310 can provide spreading sequences. Diversity encoder/multiplexer block 322 provides diversity encoding and multiplexing to implement alphabets for different possible modulation schemes. Power weighting block 324 provides amplitude modulation for modulation schemes such as 16-quadrature amplitude modulation (QAM). Power weighting block 324 utilizes conventional complex multipliers in the present embodiment to scale the symbol power appropriately for the modulation scheme. In another embodiment, the complex multiply operation can be accommodated by a simplified implementation that rotates the phase of the input.

Inputs to UTU N 240n include UTU operation information 294b and power control commands input 123a are provided to UTU 240n. Power control commands are provided by power control loop 123 from parameter estimator function block 132 operations on received signals at communication device 100*a*, as shown in FIG. 1A. Power control commands are provided to power weighting function block 324 for scaling the magnitude of the data signal.

UTU operation information input 294*b* includes information such as that listed in primary table 280*a* and secondary table 280*b* shown in FIG. 2D, that is stored in memory 222 of Tx scheduler 220, as shown in FIG. 2A. Secondary table 280*b* can also call on other cached data in memory 222, such as a protocol format table that provides a superset of all possible channel configurations for a given communication protocol chosen by a user. From this protocol format table, a specific channel format can be chosen and used to configure a UTU. UTU operation information input 162 provides information to memory for performing protocol assembly functions and other functions executed by processor 228. UTU operation information input 162 also provides information for configuring hardware such as CGU, scrambling block 320, demux and diversity block 322, chip-rate spreading block 323, and power weighting block 324.

By providing a universal transmitter unit that has configurabiltiy, the UTU can receive configuration information, parameterization information, and/or time-slicing information. Different combinations of these characteristics can be implemented by the UTU. This information shown for the present embodiment allows the UTU to be flexibly changed on a time slot by time slot basis, in order to meet the dynamically changing needs, environment, and protocols involved in a communication system.

While the present embodiment utilizes software implementations to perform the functions of data assembly, local discontinuous transmission formatting, and power level control, etc. in processor 328, another embodiment can perform these functions using a state machine in hardware. The state machine embodiment would accomplish functions much faster than a software-based embodiment, and with sufficient designed-in flexibility, e.g., appropriately parameterizeable and selectively interconnectable, can accommodate control variations existing between the multiple communication protocols.

Furthermore, while the components of UTU N 240*n* are configurable for multiple channel types and for multiple communication protocols, the present invention is well suited to hard coding the components of a transmitter unit to only a specific communication protocol. The present invention is also well suited to an embodiment further restricting the configurabiltiy of a transmitter to a specific channel type. With this embodiment, the flexibility of the universal transmitter system becomes increasingly more limited, as the universal transmitter unit resources cannot be as widely adapted to the changing needs of a communication device. Rather, they would be predetermined in this embodiment. Yet, the present invention would still provide the flexible scheduling benefits for multiple channels, and the ability to accommodate some changes in protocols. The specific choice of configurable embodiments can depend upon a given application and the needs of a user. UTU can be time-sliced or non-time sliced for either a fixed UTU or a configurable UTU. Similarly, CGU 310 can provide a fixed spreading sequence in another embodiment that is tailored to a specific channel for which a transmitter unit may be hard coded. Alternatively, in lieu of a configurable format, CGU 310 can include multiple independent code generation units that are communication-protocol specific.

In another embodiment, UTU N 240*n* can include a local memory block for storing additional information if desired, such as state information for a time-slicing operation. This embodiment would require overhead to coordinate its information between the secondary table 280*b* of FIG. 2D. However the present embodiment does not include any local memory because the scheduling paradigm described in FIG. 2D provides only the information needed to configure UTU N 240*n*, and only the data with which the UTU can process data during its time slot, e.g., virtual use 1 266 as shown in FIG. 2C.

Figure 3B:
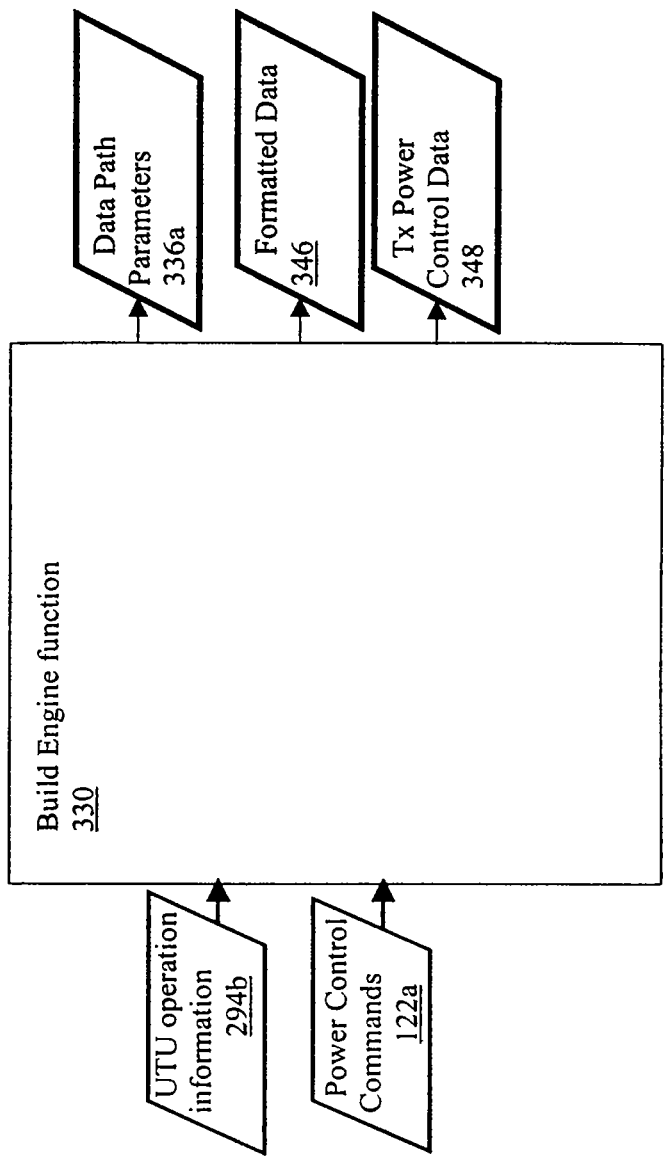
FIG. 3B is a block diagram of a build engine function for operating the universal transmitter unit, in accordance with one embodiment of the present invention.

Referring now to FIG. 3B, a block diagram of a build engine function for operating the universal transmitter unit is shown, in accordance with one embodiment of the present invention. Build engine function 330 describes an exemplary functionality implemented by processor 328 of FIG. 3A in conjunction with inputs provided, e.g., UTU operation information input 294*b* and power control commands 122*a*, as similarly provided in FIG. 3A.

Build engine function block 330 provides protocol assembler functions such as data assembly, local discontinuous transmission formatting, e.g., puncturing, power level control, antenna discontinuous transmission (DTX) formatting, shared channel control, and other functions specific to a given channel format for a given communication protocol that are well known by those skilled in the art that can be required by one of the multiple communication protocols that the communication device can accommodate.

In particular, the Tx power control function provided by build engine function block 330 loads the fields template power, modulates power with time domain function, adapts and adds diversity weighting, if applicable, and tracks assembly point in time. Furthermore, the DTX formatting function includes loading the fields template DTX, calculating adjustments with decimated long code sequences, and tracking the assembly point in time. Finally, the data assembly function includes loading the bits from the field's stream pointer, e.g., pointing to source A 230 in encoder system 130 as shown in FIG. 2A, and indicating whether the stream is unscrambled, and tracking the assembly point in time. Build engine function block 330 includes formatted data output 162, that is provided on data line 342 in FIG. 3A to downstream scrambling block 320, Tx power control data output 348 provided by control line 346 to power weighting block 324, and other configuration information, e.g., data path parameters 336*a*, to other blocks such as diversity encoder/multiplexer block 322 and chip rate spreading block 323 of FIG. 3A. By using processor 328 to implement the functionality of build engine function 320, the present invention provides flexibility to incorporate different protocols for assembling and formatting data.

Configurable Modulator

Figure 4A:
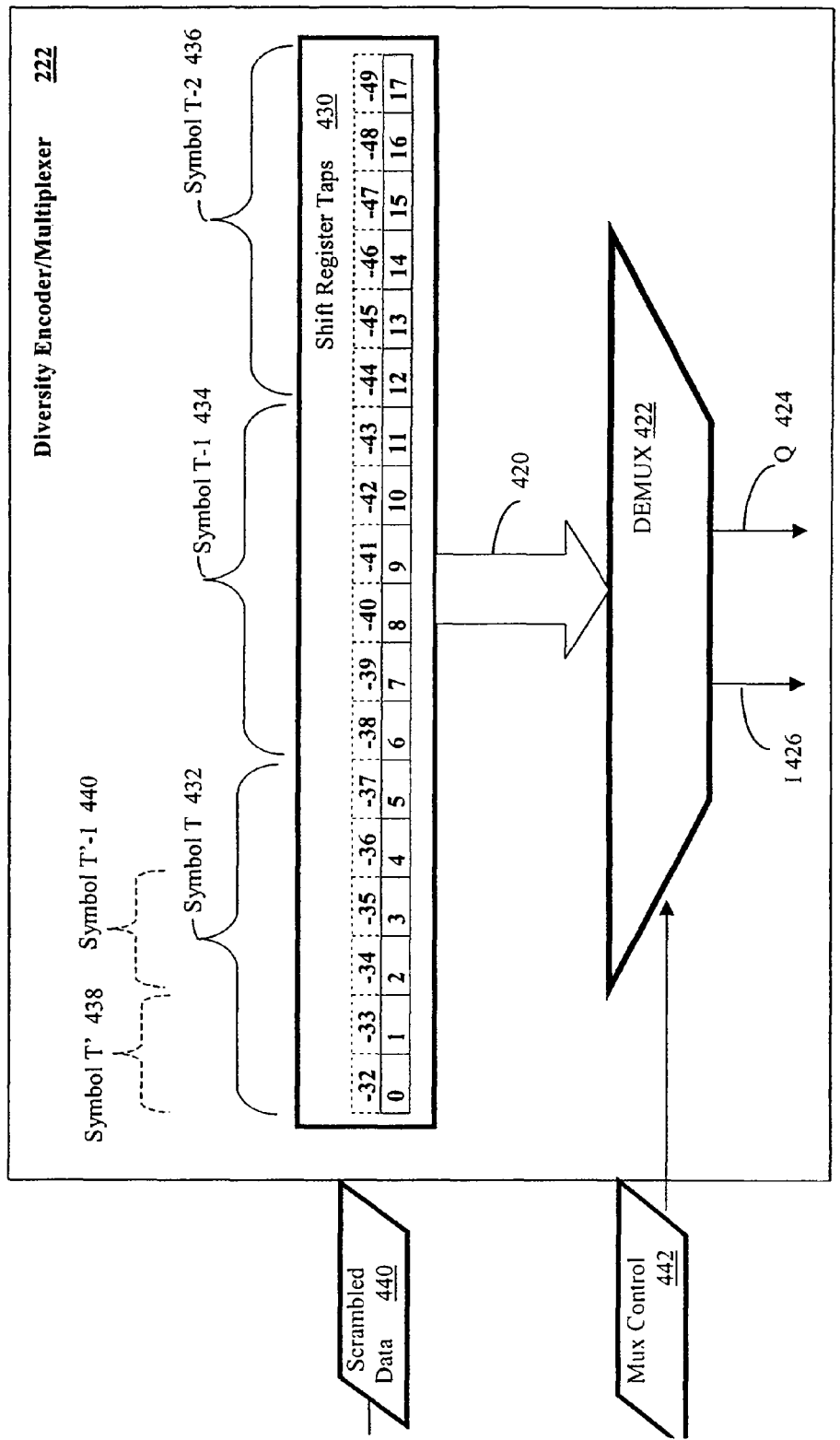
FIG. 4A is a block diagram of a configurable demux unit, in accordance with one embodiment of the present invention.

Referring now to FIG. 4A, a block diagram of a configurable demux unit is shown, in accordance with one embodiment of the present invention. FIG. 4A provides an exemplary embodiment of diversity encoder/multiplexer unit 322 of FIG. 3A. Diversity encoder/multiplexer 322 provides a wide range of diversity encoding and multiplexing bits into symbols for a wide range of modulation schemes.

Diversity encoder/multiplexer 322 includes a shift register 430 that has sequentially arranged taps. In the present embodiment, the shift register is a scrolling buffer having a first in first out (FIFO) configuration from left to right. The bottom row of cells reference numbered 0 to 17 represent shift register taps taken from shift register 430. The top row of cells numbered −32 to −49 are also reference numbers that indicate the shift register tap from shift register 430 with the notable difference that their value will be inverted by a negative 1 multiply operation in demux 422. The top row of cells is artificial and does not literally exist in shift register 430 for the present embodiment.

The first six cells of shift register 430 represent one symbol T 432 for a communication protocol that defines a symbol as having six bits of data. For example, 64-quadrature amplitude modulation (QAM) requires six bits of data for a symbol. To accommodate diversity encoding requirements, which is a reordering of information symbols, a minimum of three symbols worth of data in the most demanding modulation case, e.g., 6 bits/symbol for 64 QAM modulation times three symbols worth of data for diversity equal 18 total bits of data stored in shift register 430. Diversity encoding utilizes data from up to two prior time slots to transmit a current symbol. Thus, subsequent symbols T-1 434 and T-2 436 represent the symbol that is one time slot before and two time slots before the current time slot of T 432, respectively. By maintaining symbol data over time, e.g., time minus 1 symbol T-1 434 and time minus 2 symbol T-2 436, the present invention provides at least two prior symbols for use when modulating data from current time symbol T 432 and at least one prior symbol when modulating data from time minus one symbol T-1 434, respectively.

Few as one cell, e.g., can define a symbol a bit, of data per symbol for binary phase shift keying (BPSK). Symbol T' 438 is shown for the case of a quadrature phase shift keying (QPSK) modulation scheme, in which two bits of data are used per symbol. Data is loaded into shift register taps 430 two symbols at a time for the present embodiment. Thus, if using 64 QAM, every other clock cycle would shift the registers over two symbols and load new data for symbol T 432 and symbol T-1 434. The mux control 442 is patterned to reflect this loading protocol of the shift register taps, as provided in the example in subsequent FIG. 4B.

Shift register taps block 430 is coupled to mux 422 via coupling arrangement 420. Coupling arrangement 420 includes all required coupling arrangements between data stored in shift register taps 430 that correspond to I and Q data values. This coupling arrangement is not shown for purposes of clarity. However, one of ordinary skill in the art will appreciate that depending on the definition of a symbol, and the type of modulation protocol used, data must be selected from the specific cells of data in shift register taps as defined by the communication protocol. If all these combinations are provided to mux 422, then a sufficiently complex mux control 442 can select the appropriate coupling arrangement from all the possible combinations. The present embodiment requires a mux control input 442 of eight bits because of the high quantity of possible inputs to mux 422. A table in subsequent FIG. 4B provides an example of mux control input for a given modulation protocol, which in turn provides the definition for the coupling arrangement 420. Thus the different modulation protocols provide the definition for the necessary coupling arrangements 420.

Scrambled data input 440 is provided to demux 322 via line 330 as bits of data that are assembled together by the processor 328 and scrambling unit 320 of FIG. 3A. Mux control input 442 is provided from H/W control parameters set by S/W 286 as shown in FIG. 2D. Mux control input calls out the reference position numbers listed in the shift register tap cells. In-phase (I) output line 426 and quadrature phase (Q) output line 424 from demux 422 provides the appropriate received data for downstream modulation of an in-phase portion and quadrature phase portion of magnitude and sign of a signal, depending upon the modulation scheme used.

By using the configurable diversity encoder and multiplexer 322, all the higher order modulation protocols can be realized by controlling the combination of taps of data provided as output from demux 422. In particular, a list of mux control inputs 442 can be provided to automatically select the correct shift register taps for the desired modulation protocol.

EXAMPLES

The present invention is able to accommodate a wide range of modulation protocols including phase shift keying modulation and quadrature amplitude modulation. For example the present embodiment can accommodate binary phase shift keying (BPSK) that utilizes one bit per symbol, quadrature phase shift keying (QPSK) that utilizes two bits per symbol, and 8 phase shift keying (8-PSK) that utilizes three bits per symbol. The present invention is also well suited to implementing amplitude modulation formats such as 16-quadrature amplitude modulation (16-QAM) utilizing four bits per symbol, and 64-QAM utilizing six bits per symbol. Furthermore, the present invention can accommodate space-time transmit diversity (STTD), time switched transmit diversity (TSTD), orthogonal transmit diversity (OTD), and space-time spreading (STS). Time transmit diversity portions of diversity transmissions are accommodated by providing prior data samples for constructing a symbol of a current transmission. Additionally, the selection of shift register taps over time is provided by mux control input 442, which increments in time and specifies taps to select the symbol information provided via demux 422. Local memory is used in the present embodiment to store list of mux control. Alternatively, a state machine or local memory registers can store mux control information. Mux control state is stored as context information, e.g. in secondary table 280b in the present embodiment.

Output from mux 422 on lines I 426 and Q 424 provides the appropriate data for the in-phase portion and quadrature phase portion, respectively, of magnitude and sign, depending upon the modulation scheme used. In a QAM protocol, I magnitude and Q magnitude and phase is used to scale symbol power, as known by those skilled in the art. For PSK, the I magnitude and Q magnitude outputs are constants because all symbols have the same magnitude. The I sign demux and Q sign demux, utilized for a phase modulation protocol, are provided to a complex multiplier in power weighting block 324 of FIG. 3A, along with a scrambling code from CGU 310, and complex weights which rotate the constellation in multiples of 45 degrees, selectable by address. For an 8-PSK modulation, two UTUs can be utilized, e.g., each UTU performing QPSK, but with a 45 degree rotation with respect to each other.

Diversity encoder and multiplexer 322 provides a robust and efficient method for accommodating a wide variety of modulation protocols including phase modulation, amplitude modulation, transmit diversity, and combinations thereof. By providing an appropriate mux control input 442, the desired form of modulation can be implemented by demux 422.

While the present embodiment provides for a wide range of modulation schemes, the present invention can be adapted to any combination of modulation schemes, with the appropriate amount of shift register taps and connectivity 420 to demux 422. Data could be loaded into shift register 430 only one symbol at a time, with a corresponding change in mux control input 442 in another embodiment. Additionally, in lieu of a hard coded interconnect 420 from demux to shift register 430, the present invention is also well suited to using a bus interface between shift register and output Q 424 and I 426. A bus would allow unlimited flexibility in obtaining data from any shift register location. Furthermore, while the demux 422 is presented as a single unit with low propagation delay, the demux selection process can be implemented in another embodiment using multiple demuxes in parallel and in series to accomplish the same logic. However, while these multiple demux units will be simpler, they will increase the propagation delay.

Referring now to FIG. 4B, a table of data for dynamically operating the configurable demux unit is shown, in accordance with one embodiment of the present invention. Table 400 B provides an exemplary embodiment of a mux control input 442 for demux 422 of FIG. 4A.

Table 400b include multiple columns that represent the desired tap to be selected, e.g., select tap input 1 456, select tap 2 458, select tap 3 460, select tap 4 462, select tap 5 464, select tap 6 466, select tap 7 468, and select tap 8 470. Each of the select taps 456-470 represent the amount of connectivity to shift register 430 of FIG. 4A for the range of modulation schemes for which diversity encoder and multiplexer 322 can be configured. Thus, not all shift register taps are needed for each modulation protocol.

Table 400B provides exemplary entries for mux control 442 that specify tap locations in shift register 430 that are required for a non-diversity quadrature phase shift keying (QPSK) modulation protocol. Because two bits makes a symbol for QPSK, symbol T' 438 and T'-1 440 only cover two bits worth of data in the shift register 430. Also, because the shift register loads data for two symbols at a time, the first two symbols, e.g., symbol T' 438 and symbol T'-1 440, are present in shift register 430 of FIG. 4A for describing this mux control example. The '–1' values for the other columns for table 400B indicate that the inputs to demux 422 for those columns are ignored, as no other data inputs are required for non-diversity QPSK modulation besides the two data bits provided by select tap 1 column 456 and select tap 2 column 458. Additional information for the method of implementing table 400B is provided in subsequent FIG. 5F. The values for mux selector table 400b are provided by secondary table 280b of FIG. 2D, either by reference to another LUT or by storing values in column 288.

Because the connectivity for the demux is contained in software, it can easily be modified for new and different modulation schemes. Thus, the diversity encoder/multiplexer unit 322 provides a significant amount of flexibility with fast processing capability and robust operation. While the present invention provides a specific table format, this format can change with respect to the loading operation of shift register and the quantity of selects in demux unit 422.

Processes

Figure 5A:
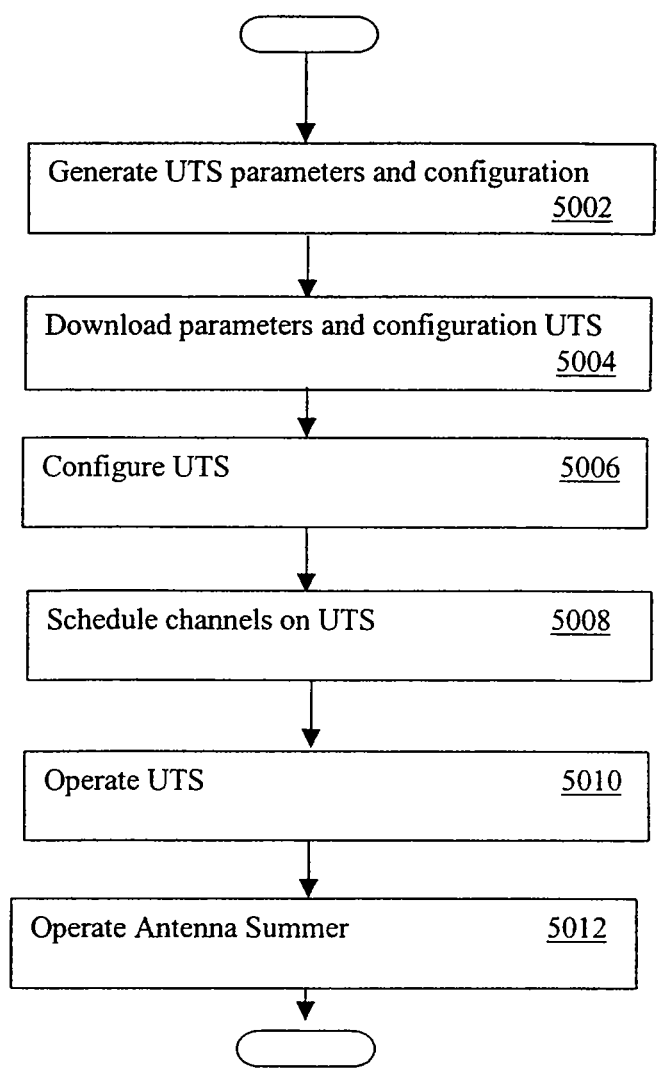
FIG. 5A is a flowchart of a process for operating a universal transmitter system, in accordance with one embodiment of the present invention.

Referring now to FIG. 5A, a flowchart of a process for operating a universal transmitter system (UTS) is shown, in accordance with one embodiment of the present invention. By using Flowchart 5000, a user can develop and implement proprietary algorithms and user-specific operation instructions in the configurable UTS.

Flowchart 5000 begins with step 5002, for which the present embodiment generates UTS parameters, configuration and scheduling information. Step 5002 is implemented in the present embodiment using offline computer system that is known to those skilled in the art to provide the functionality of generating configuration information by mapping and translating the needs and requests of a user to the capabilities and quantities of resources known to be available for a UTS. This allows the user to have significant control, as a user-friendly level, over the universal transmitter system 140 and each universal transmitter unit, e.g., 240a through 240n of FIG. 2A. Additional information on configuring of hardware resources is described in co-pending U.S. patent application Ser. No. 09/772,582 entitled "METHOD OF GENERATING A CONFIGURATION FOR A CONFIGURABLE SPREAD SPECTRUM COMMUNICATION DEVICE" by Subramanian et al., attorney docket number 9824-083-999. This related application is commonly assigned, and is hereby incorporated by reference. Following step 5002, flowchart 5000 proceeds to step 5004.

In step 5004 of the present embodiment parameters, configuration, and scheduling information is downloaded to the UTS. Step 5004 is implemented in the present embodiment using download link 209 of FIG. 5A to load communication device 2043 that has at least one configurable transmitter unit 222. In one embodiment, the description of communication device 100a can be used for communication device 204. In this manner, UTS 140 can be configured to operate. Without this information, UTS 140 has insufficient information to be operable in the present embodiment. Downloaded parameters, configuration and scheduling information is provided as transmitter configuration input 142 of FIG. 1A to communication device 100a. Alternatively, UTS 140 could be preloaded with a default configuration in another embodiment to allow it to perform some level of functionality without user input. For example a default configuration could be hard coded into ROM, but this provides little flexibility. Steps 5002 and 5004 can be repeated as required to instantiate new configurations of new or existing communication protocols for communication device. Following step 5004, flowchart 5000 proceeds to step 5006.

In step 5006 of the present embodiment the UTS is configured. Step 5006 is implemented in the present embodiment by implementing VMI functions 160 of FIG. 1B to translate transmitter configurations input 142 into UTS operating information output 162. This result is provided as input UTU operation information 162 to UTS 140 as shown in FIG. 2A. UTU operation information includes information such as control field configurations and assembly code to configure the discrete hardware devices located throughout the UTS 140. Following step 5006, flowchart 5000 proceeds to step 5008.

In step 5008 of the present embodiment, channels are scheduled on the UTS. Step 5008 is implemented in the present embodiment by receiving a request by host processor 122 to transmit a new channel on UTS. Primary table 280a and secondary table 280b are updated to reflect changes in the channels operated on UTS 140, and specifically on UTUs 240a through 240n. Subsequent Flowchart 5200 provides one embodiment of implementing step 5008. Following step 5008, flowchart 5000 proceeds to step 5010.

In step 5010 of the present embodiment the UTS is operated. Step 5010 is implemented in the present embodiment by having primary table 280a and secondary table 280b provide control to a UTU, e.g., via output UTU 294a of FIG. 2D. A UTU is executed as described in FIGS. 2A, 2B, 4A and 4B. Operating information input 162, e.g., in terms of control register information, provides channel identification, thus enabling the UTU to execute. Subsequent Flowchart 5300 provides one embodiment of implementing step 5010. Following step 5010, flowchart 5000 proceeds to step 5012.

In step 5012 of the present embodiment the antenna summer is operated. Step 5012 is implemented in the present embodiment as described in FIGS. 2A and 2B for multiple embodiments. Following step 5012, flowchart 5000 ends.

Figure 5B:
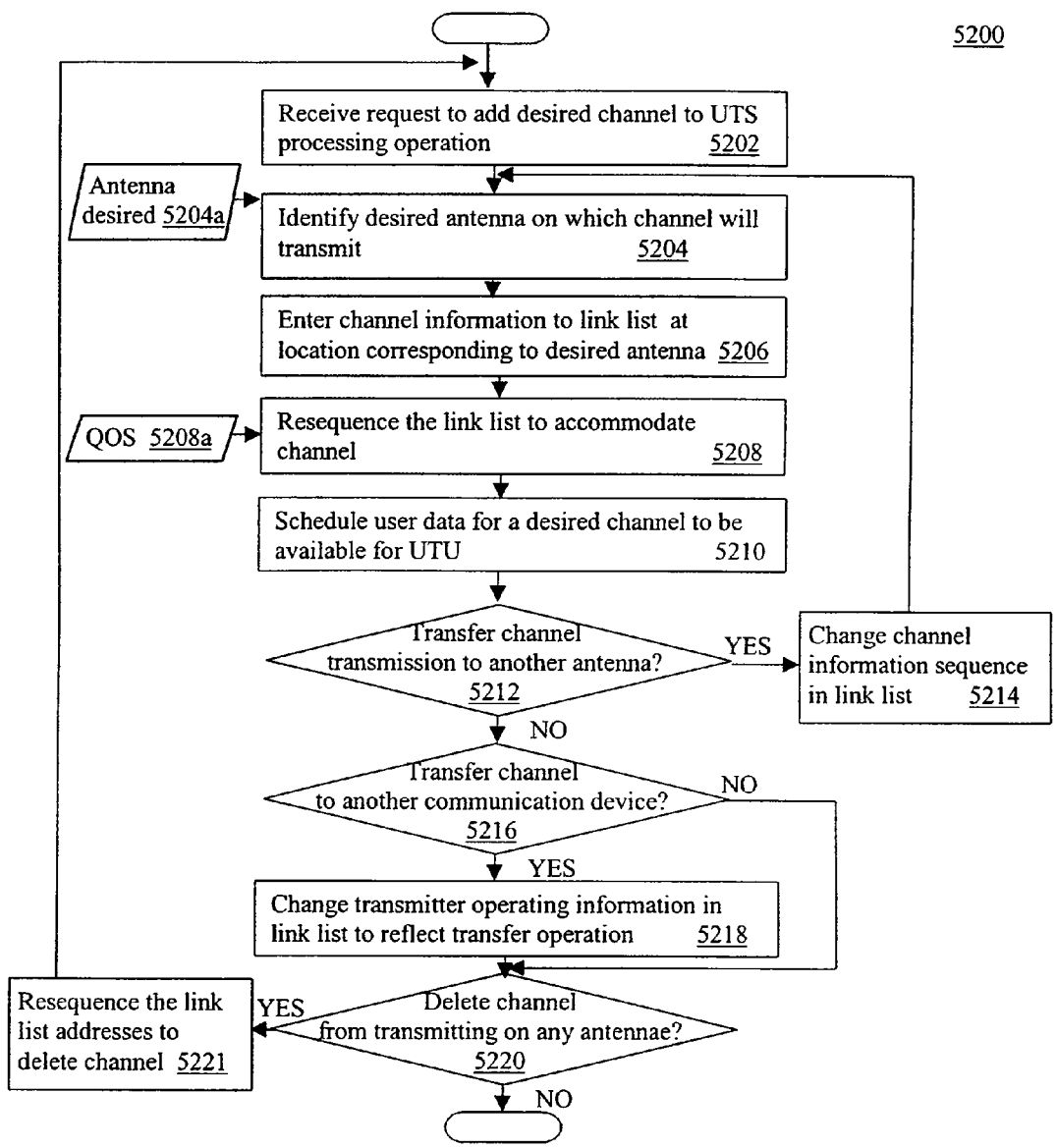
FIG. 5B is a flowchart of a process for controlling a universal transmitter system, in accordance with one embodiment of the present invention.

Referring now to FIG. 5B, a flowchart of a process for controlling a universal transmitter system is shown, in accordance with one embodiment of the present invention. Flowchart 5200 allows for the apriori scheduling of a channel according to the antenna destination of the channel and available resources in the UTS. Consequently, this process avoids contentions and providing efficient use of hardware resources.

In step 5202 of the present embodiment a request is received to add a desired channel to the UTS. Step 5202 is implemented in the present embodiment by receiving a request from a higher-level controller, such as the host controller 122, at the Tx scheduler 220. Following step 5202, flowchart 5200 proceeds to step 5204.

In step 5204 of the present embodiment identifies the desired antenna on which the channel is slated to transmit. Step 5206 is implemented in the present embodiment by higher-level controller, e.g., host controller 122 in FIG. 1A providing information as to what antenna a channel is to be transmitted, shown as input 5204a. The desired antenna is known from the reception of the user's signal, which a receive path can provide to host controller 122. For example, if it is known that the user is in a sector of a base station it will designate an antenna, e.g., antenna A 201a, in that sector for transmitting back to the user. It is beneficial to know the antenna on which a channel will transmit, because in this manner, all channels transmitting on a given antenna may be grouped together and processed at one time. This avoids inefficient switching or coupling back and forth between antennae over the wide range of channels being processed for transmission. In the embodiment, the row in which the information is placed, within a given chunk list corresponding to an antenna is not significant, as all entries within the chunk list of the secondary table 280b will be processed for the given antenna. Following step 5204, flowchart 5200 proceeds to step 5206.

In step 5206 of the present embodiment channel information for the desired channel is entered into the link list at the location corresponding to the desired antenna. Step 5206 is implemented in the present embodiment by entering as channel information, the control parameters for UTS 140 and UTU as described in FIGS. 2A, 2D, and 3A into secondary table (link list) 280B of FIG. 2D. Thus, if it is known that the user is in a sector of a base station having antenna A 201 a, then the information for operating the channel is entered into salve table in an open slot corresponding to antenna A, which per the primary table 280a starts at location '0001'. Looking at the secondary table 280B, it is apparent that Transmitter N at virtual use 1, under columns 284 and 285 respectively, has an on/off flag set to 'off' in column 286. Therefore it would be acceptable to place the channel information, e.g., UTU configuration, in that row. Two or more transmitters can be utilized in conjunction with each other to configure for a channel format that was not provided in the download list or that is a new channel format that was not accounted for in the download list, e.g., the 8-PSK case discussed hereinabove linked for operating on the same antenna. Following step 5206, flowchart 5200 proceeds to step 5208

In step 5208 of the present embodiment the entries can be resequenced to accommodate new channels or user preferences. The sequence of channels in the secondary table is not significant in the present embodiment, as the results will be added for a given antenna and then transmitted on top of each other, as designed for a direct sequence spread spectrum communication protocol. For the same reason, the specific transmitter unit on which a channel is executed as configured by the secondary table 280b is not significant and can even change from one system cycle to the next.

Step 5208 is implemented in the present embodiment by receiving an indication for a user preference for a given channel. Alternatively, an internal default code can be provided that gives different channel formats a higher priority or a lower priority. Step 5208 is optional in the present embodiment because it is not essential to the process, but does add flexibility to scheduling and management of transmitter resources. Furthermore, while all entries in a chunk list for a given antenna are processed, the last entries in the chunk list will complete the transmit processing last and therefore, may be the data that exceeds the saturation limit for the antenna, and thus be clipped. A quality of service (QOS) input 5208a can provide the ranking priority to decide which channel is expendable. Two chunk lists can be operated in series, and summed for the same antenna, assuming saturation is not reached. Can change some unimportant channel destinations to handle more important channel designations, e.g., trash a power control or random channel in exchange for utilizing a UTU for a data channel. Following step 5208, flowchart 5200 proceeds to step 5210.

In step 5210 of the present embodiment the user data is scheduled for a desired channel to be available. Step 5210 is implemented in the present embodiment by host processor 122 providing instruction for encoder system 130 of FIG. 1A to have data available in a source, e.g., source A 230a, from which the scheduled UTU can draw data to process for subsequent transmission. In this manner, idle time is reduced and the overall communication device 100a operates more efficiently. Following step 5210, flowchart 5200 proceeds to step 5212.

In step 5212 of the present embodiment an inquiry determines if the channel is requested to be transferred to another antenna. If the channel is requested to be transferred to another antenna, then flowchart proceeds to steps 5214. However, if the channel is not requested to be transferred to another antenna, then Flowchart 5200 proceeds to step 5216. Step 5212 is implemented in the present embodiment by receiving a request a the host processor 122 of FIG. 1A to transfer a channel, e.g., a user mobile, to another antenna. This situation arises when a mobile unit has physically moved locations and is now in a better reception with a different antenna than the one on which communications are currently being performed.

In step 5214 of the present embodiment, channel information is transferred to a new location in the link list to reflect the change in antenna transmission. Alternatively, step 5214 can re-link the list to accomplish the change in sequence to reflect the new antenna location for the channel. This step may involve compressed mode operation to allow measurements. This operation can be referred to as a softer handoff. Step 5214 is implemented in the present embodiment by moving channel information within secondary table 280B to reflect the new antenna location. For example, information in columns H/W control parameters set by S/W 287 and H/W control parameters set by H/W 288 will move from a slot for a current antenna location, e.g., slot Transmitter A and virtual use 1 for Antenna A, on which the mobile is presently communicating to a new slot, e.g., on transmitter N, virtual use 2, for a new antenna, e.g., Antenna H, on which the user wants to communicate next. Parts of these steps are also described in step 5204 through 5210. This transfer of information is shown by path 295 in secondary table 280B of FIG. 2D. Control information for the given channel has to be reentered in the correct chunk list of table 280B for the appropriate antenna in one embodiment. However, in another embodiment, the control information for the given channel does not have to be reentered to the link list per step 5206. This is because the channel information already exists at the end of a previous chunk list. The desired, or new, chunk list for the channel only need link, at the end of its chunk list, to that last entry of the old chunk list having the desired channel information. After the control information executes, the old chunk list will end and return control to the primary table 280A, as if the desired channel information were in the new chunk list. If a new channel does not take the place of the old slot, e.g., Transmitter A and virtual use 1, then the on/off flag in column 286 can be changed to 'off' in which case, the control will be skipped and the hardware resource for that virtual use will be idle. Following step 5214, flowchart 5200 proceeds to step 5208.

In step 5216 of the present embodiment an inquiry determines if the channel is requested to be transferred to another communication device. If the channel is requested to be transferred to another communication device, then flowchart proceeds to steps 5218. However, if the channel is not requested to be transferred to another communication device, then Flowchart 5200 proceeds to step 5220. Step 5216 is implemented in the present embodiment by receiving a request at host processor 122 of FIG. 1A to transfer a channel, e.g., a user mobile, to another antenna. This situation arises when a mobile unit has physically moved locations and will have better reception at another communication device, e.g., base station, than the current communication device.

In step 5218 of the present embodiment the transmitter operation will be changed in link list to reflect transfer operation. This is known as a soft handoff if the communication protocols of the two communication devices, e.g., base stations, are the same. If the communication protocols of the two communication devices, e.g., base stations, are different, then it is referred to as a hard handoff. Step 5218 is similar to step 5214 in that the control information in secondary table (or link list) 400B, will be moved or the virtual use will have an 'off' designation if no other channel needs. However, the transfer of a channel to another communication device requires more control interfacing to successfully execute this operation. The additional control information might include discontinuous transmission and compressed mode operations, both of which may be adapted by changing control parameters in secondary table 280B to reflect the channel type desired, e.g., compressed mode channel transmission. Following step 5218, flowchart 5200 proceeds to step 5220.

In step 5220 of the present embodiment an inquiry determines if a channel is to be deleted from transmission on any antenna. This step arises if a user, e.g., a mobile, has completed a call and has no further need of data transmissions. This step might also arise if the channel fades and is therefore no longer acceptable to transmit. Step 5220 is implemented in the present embodiment by control from host processor 122 of FIG. 1A evaluating a request to drop the channel, or by host processor 122 and/or parameter estimator determining that the channel performance is insufficient. Following step 5220. If a channel is to be deleted from transmission on any antenna, then flowchart 5200 proceeds to step 5221. However, if no channel is to be deleted, then flowchart 5200 ends.

In step 5221 of the present embodiment the control information for the given channel is disenabled. Step 5221 is implemented in the present embodiment by effectively turning off an on/off flag in column 286 for the channel information in question to idle the given physical resource/virtual use. Alternatively, the control parameters in column 287 and 288 of secondary table 280B for a new channel can be overwritten on the control parameters for the channel that was deleted. Following step 5221, flowchart 5200 proceeds to step 5202. The present embodiment of UTS 140 utilizes multi-ported memory to allow simultaneous read and write operations, e.g., if antenna H information is being read from memory, changes to antenna A can simultaneously be implemented. A change request to an antenna currently being operated is stored in a buffer with a time stamp to specify when the change should be implemented.

Figure 5C:
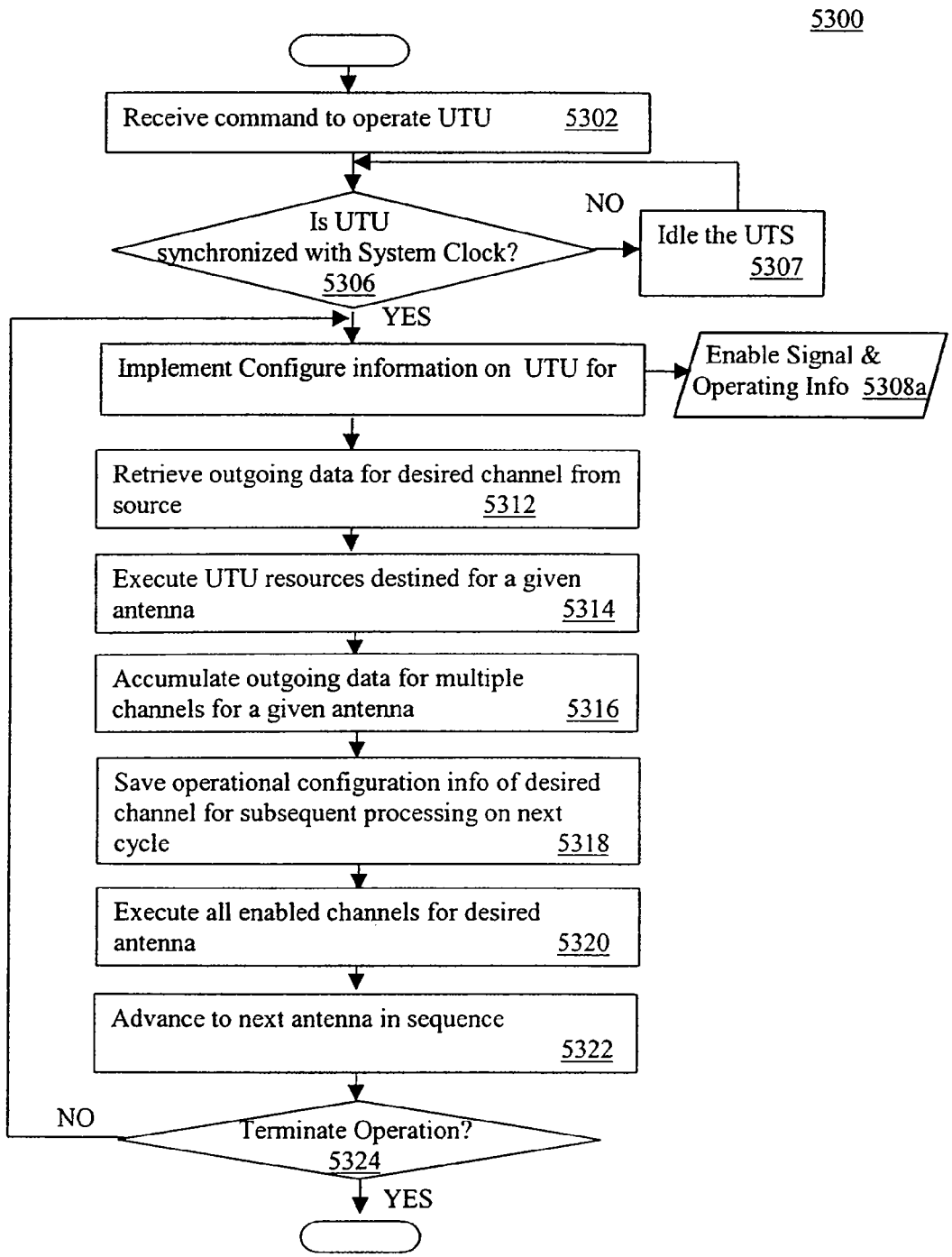
FIG. 5C is a flowchart of a process for operating a universal transmitter unit, in accordance with one embodiment of the present invention.

Referring now to FIG. 5C, a flowchart of a process for operating a universal transmitter unit is shown, in accordance with one embodiment of the present invention. Flowchart 5300 operates in conjunction with flowchart 5200 that can be constantly changing the scheduling of the UTU resources, deepening upon the changes in the operating environment of the communication device.

In step 5302 of the present embodiment a command is received to operate the UTS. Step 5302 is implemented in the present embodiment by receiving request from host processor 122 of communication device 100a in FIG. 1A during initialization. In this step, much of the configuration and parameter information is received and loaded into memory 222 of Tx scheduler 220, e.g., portions of data under hardware control parameters set by software column 287. Memory is also mapped to set up secondary table 280B during initialization in one embodiment. Following step 5302, flowchart 5300 proceeds to step 5306.

In step 5306 of the present embodiment an inquiry determines whether the UTU is synchronized with the system clock. If the UTU is synchronized with the system clock, then flowchart 5300 proceeds to step 5308. However if the UTU is not synchronized with the system clock, then flowchart 5300 proceeds to step 5307. Step 5307 is implemented in the present embodiment by control logic in controller 224 of Tx scheduler.

In step 5307 of the present embodiment the UTS is idled. Step 5307 is implemented in the present embodiment by a state machine or command that causes UTS to wait for a system clock pulse with which the UTS may be synchronized. The clock pulse will provide an enabling signal to initiate synchronization of UTS. While not shown in FIGS. 1A, 2A, 2B, 3A and 4A, clock lines are provided to components in communication device 100a to provide synchronization between components. Following step 5307, flowchart 5300 returns to step 5306.

In step 5308 of the present embodiment the configuration information for a UTU on a given antenna is implemented. Step 5308 is implemented in the present embodiment by primary table 280a and secondary table 280b being executed, e.g., by controller 224. Information output 6308a, and shown in FIG. 2D as output 294a, provides information such as control register information for operating the UTU and related hardware, from memory, e.g., memory 222, to the components of the UTU, such as those described in FIG. 3A. For example, if the primary table 280a begins at the top of the table, then context information for channels designated for transmitting on antenna 1 will be executed. The first entry in secondary table is the row with exemplary address '0001'. The group of the rows, or slots, of information for each given physical resource/virtual use combination slated for a given antenna can be referred to as a chunk list. The configuration information may be provided as a prefetch operation (or setup) as shown in FIG. 2C by setup 266a for setup of Virtual use 1 266. The prefetch operation preempts the lag time associated with retrieving data. Following step 5308, flowchart 5300 proceeds to step 5312.

In step 5312 of the present embodiment data is retrieved for the desired channel from memory. Step 5312 is implemented in the present embodiment by a call from the secondary table 280b to encoder system 130 of FIG. 2A to provide the amount of data needed for the given virtual use of the physical UTU resource. If the information is not available from encoder system 130, then a discontinuous transmission can occur or an error message can be provided to a higher-level controller, e.g., host processor 122. However, in the present embodiment, calls for data occur directly between the UTS 140 and the source, e.g., source A 230*a* of encoder system 130. Thus, the system operates autonomously from host uP 122, thereby improving overall efficiency of communication device 100*a*. Address locations are provided for a given context in secondary table that indicate which source, e.g., source A 230*a* through source N 230*n*, has the appropriate data for the channel to be transmitted. Following step 5312, flowchart 5300 proceeds to step 5314.

In step 5314 of the present embodiment the UTU is executed for the desired channel. Step 5314 is described in more detail in subsequent FIG. 5D, in one embodiment. Following step 5314, flowchart 5300 proceeds to step 5316.

In step 5316 of the present embodiment the outgoing data for multiple channels of a given antenna are accumulated. Step 5316 is implemented using antenna summer 150*a* or 150*b* as shown in FIGS. 2A and 2B respectively. Flowchart 5500 provides in subsequent FIG. 5E provides more details for one embodiment of implementing step 5316. Following step 5316, flowchart 5300 proceeds to step 5318.

In step 5318 of the present embodiment the operational configuration of a desired channel is saved for subsequent processing on another cycle. The relevant operational information includes states, configuration, and timing information for appropriate devices of UTU. Step 5318 is implemented in the present embodiment by save portion, e.g., 266*c*, of virtual use, e.g., virtual use 1 266 of a hardware element A 241 as shown in FIG. 2C. The save operation detects information from UTU and saves it back to secondary table 280B or other linked table in memory 222 of Tx scheduler 220. Following step 5318, flowchart 5300 proceeds to step 5320.

In step 5320 of the present embodiment all the channels for a given antenna have been executed. Step 5320 is implemented in the present embodiment by the primary table 280*a* and secondary table 280*b* of FIG. 2D as executed by controller 224 of FIG. 2A. In particular, every line of code is executed sequentially within the chunk list for a given antenna, assuming that it has an on/off flag set to 'on' in column 286, until it reaches the last line, wherein the return to primary list column 289 has an 'end' that essentially provides a pointer back to the primary table 280*a*, as shown by arrow 292, to which it returns control. Following step 5320, flowchart 5300 proceeds to step 5322.

In step 5322 of the present embodiment, the system is advanced to the next antenna. This allows UTU information associated with the next antenna to be accessed. Step 5322 is implemented by the automatic link from antenna A to the next antenna in Master table 280*a* of FIG. 2D. For example, antenna H is the next antenna after antenna A has exhausted all UTU instructions in the chunk list associated with antenna A in secondary table 280*b*. In this manner, primary table increments to the next line of control instructions which points it back to the appropriate resources in secondary table 280*b* for operating UTU devices slated to transmit on antenna H. Following step 5322, flowchart 5300 proceeds to step 5324.

In step 5324 of the present invention, an inquiry determines whether the operation of the UTU is terminated. Step 5324 is implemented in one embodiment by turning off power to UTU to terminate operation or leaving power on to allow continued operation of UTU. If the operation of the UTU is terminated, then flowchart 5300 ends. However, if operation of the UTU is not terminated, then flowchart returns to step 5308.

Figure 5D:
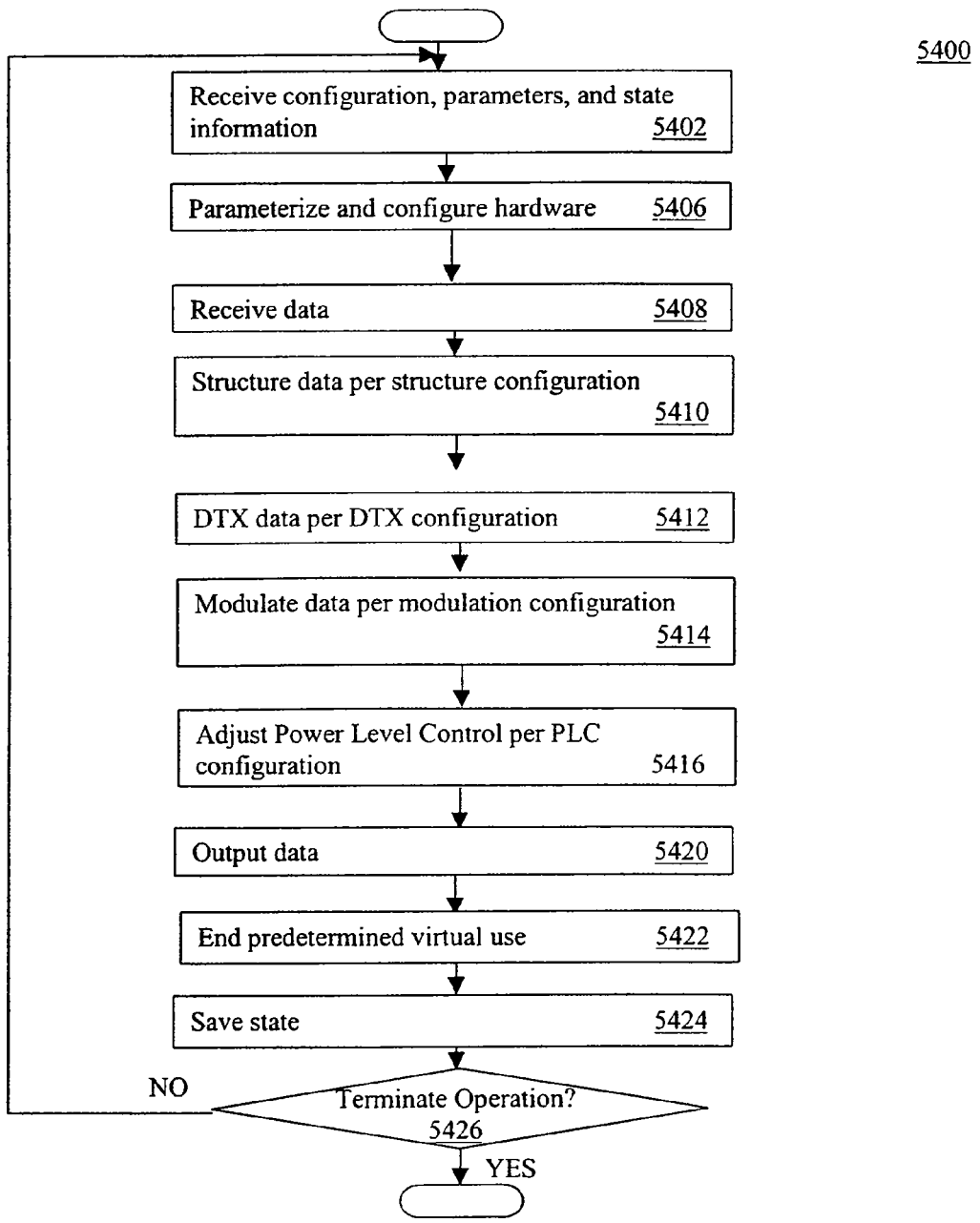
FIG. 5D is a flowchart of a process for operating a configurable transmitter, in accordance with one embodiment of the present invention.
Figure 5E:
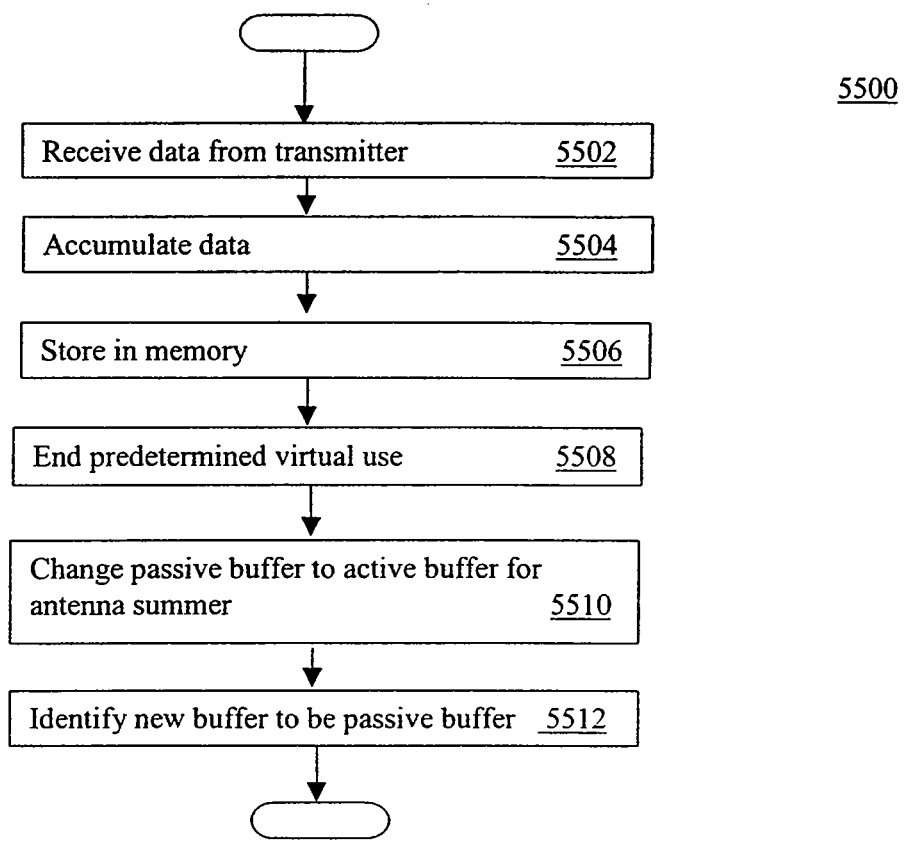
FIG. 5E is a flowchart of a process for operating an antenna summer, in accordance with one embodiment of the present invention.

Referring now to FIG. 5D is a flowchart of a process for operating a configurable transmitter, in accordance with one embodiment of the present invention. Flowchart 5400 provides an exemplary description of the detailed steps for implementing step 5314 of FIG. 5C.

In step 5402 of the present embodiment, the configuration, parameters and state information is received by the configurable transmitter. Step 5402 is implemented in the present embodiment by receiving the information from the secondary table 280*b* for a designated UTU, e.g., A 240*a*, and other configurable components associated with the given UTU. FIG. 2A shows how the Tx scheduler 220 is coupled directly to each physical hardware resource, e.g., line 244 couples Tx scheduler 220 to transmitter N 240*n*. The information provided by step 5402 includes information from other reference tables, to which the context in secondary table 280*b* might point, in memory 222 or other local or host memory 120, Step 5402 is also shown as UTU operating information 294*b* input to transmitter N 240*n* of FIG. 3A. Following step 5402, flowchart 5400 proceeds to step 5406.

In step 5406 of the present embodiment the hardware is parameterized and configured. Step 5406 is implemented in the present embodiment by implementing the information received from step 5402 into the actual hardware. For example, CGU 310 of FIG. 3A receives state and coupling information to allow it to continue the appropriate sequence at the appropriate point in code space from which it left off on a previous cycle for the given channel. In another embodiment, demux information for, and position in, table 300B in FIG. 3C may be provided implemented for demux 422. Processor 328 also receives instructions for performing build engine functions 330 of FIG. 3B. Following step 5406, flowchart 5400 proceeds to step 5408.

In step 5408 of the present embodiment user data is received. Step 5408 is implemented in the present embodiment in a manner described in step 5312 in the previous figure. Following step 5408, flowchart 5400 proceeds to step 5410.

In step 5410 of the present embodiment the data is structured as required by a structure configuration, e.g., slot format protocol, provided by secondary table 300B, or another table referenced by the entry in secondary table 300B. Step 5410 is implemented by processor 328 of FIG. 3A in the present embodiment which building the data into the prescribed frame lengths as dictated by the slot format. Configuration data for the data structure was provided by step 5406. Following step 5410, flowchart 5400 proceeds to step 5412.

In step 5412 of the present embodiment data is formatted for discontinuous transmission (DTX) per the DTX configuration as provided in step 5406. Step 5412 is implemented in the present embodiment by processor 328 of FIG. 3A. Following step 5412, flowchart 5400 proceeds to step 5414.

In step 5414 of the present embodiment the data is modulated per the modulation configuration. Step 5414 is implemented by receiving information to retrieve data from shift register 430 in FIG. 4A. It also provides configuration and state information for CGU 310 in FIG. 3A such that it will provide the appropriate scrambling data to scrambling unit 320. Step 5414 is implemented in the present embodiment as described in subsequent flowchart 5600. Following step 5414, flowchart 5400 proceeds to step 5416.

In step 5416 of the present embodiment the power level control (PLC) is adjusted per the PLC configuration. Step 5414 is implemented in the present embodiment by processor 328 of FIG. 3A per the configuration information received per step 5406. Following step 5416, flowchart 5400 proceeds to step 5418.

In step 5420 of the present embodiment the processed data is output from the UTU. Step 5420 is implemented in the present embodiment by communicating the data from a UTU, e.g., UTU A 240*a* onto a bus, e.g., 136, that will direct the data to an appropriate antenna summer in antenna summer block 150*a*, as shown in FIG. 2A or antenna summer block 150*b* as shown in FIG. 2B. Following step 5420, flowchart 5400 proceeds to step 5422.

In step 5422 of the present embodiment the end of the predetermined virtual use occurs. Step 5422 is implemented in the present embodiment by enable signals from secondary table 280*b* indicating that a new virtual use of a physical resource is queued up. This is illustrated in FIG. 2C wherein virtual use 1 266 processes data for a duration 266*b*. When the virtual use 2 168 is queued to start, the setup information 168*a*, and an enable signals provides the handoff between the two virtual uses of the given hardware resource. Steps 5408 through 5420 occur continuously until step 5422 is realized in the present embodiment.

In step 5424 of the present embodiment the state of the UTU is preserved. Step 5424 is implemented in the present embodiment in the time period indicated in FIG. 2C, e.g., save operation 266*c* for virtual use 1 266 of hardware element A 241*a*. Step 5424 is implemented by receiving the states from the appropriative devices in the UTU, e.g., CGU 310, diversity encoder/modulator 322, of UTU N 240*n* of FIG. 3A and saving them to the appropriate column of parameters, e.g., column 287*u* or 288, in secondary table 280*b*. Following step 5424, flowchart 5400 proceeds to step 5426.

In step 5426 of the present invention, an inquiry determines whether the operation of the configurable transmitter is terminated. Step 5426 is implemented in one embodiment by turning off power to UTU to terminate operation or leaving power on to allow continued operation of UTU. If the operation of the UTU is terminated, then flowchart 5400 ends. However, if operation of the UTU is not terminated, then flowchart returns to step 5408.

Referring now to FIG. 5E, a flowchart of a process for operating an antenna summer is shown, in accordance with one embodiment of the present invention. Flowchart 5500 provides an exemplary embodiment of the detailed steps for implementing step 5316 of FIG. 5C.

In step 5502 of the present embodiment data is received from the transmitter. Step 5502 is implemented in the present embodiment by receiving data from bus 136 in antenna summer block 150*a* or 150*b* of FIGS. 2A or 2B, respectively. For antenna summer block 15*a*, data provided in primary table 280*a* enables the appropriate antenna summer for the antenna, which the primary table is executing on secondary table 280*b*. Following step 5502, flowchart 5500 proceeds to step 5504.

In step 5504 of the present embodiment the data is accumulated by an antenna summer. Step 5504 is implemented in the present embodiment by an accumulator (not shown) in each antenna summer, 250*a* through 250*h* in antenna summer block 150*a*. Alternatively, step 5504 is implemented by accumulator 252 of antenna summer block 150*b* that receives new data from a given UTU and adds it to the previous values for the given point in time from other UTUs for the given antennae. The antenna summer or RAM that is receiving data in step 5504 is referred to as a passive antenna summer or buffer because it is not actively communicating to an antenna. Following step 5504, flowchart 5500 proceeds to step 5506.

In step 5506 of the present embodiment the accumulated result is stored in memory. Step 5506 is implemented in the present embodiment by storing the result from the accumulator in a memory portion of an antenna summer in antenna summer block 150*a* for which the UTS is processing. Alternatively, step 5506 is implemented in one of the RAM units of antenna summer block 150*b*, e.g., the passive unit slated for accumulating data. Following step 5506, flowchart 5500 proceeds to step 5508.

In step 5508 of the present embodiment the end of the predetermined virtual use occurs. Step 5508 is implemented in the present embodiment by the controller architecture that implements a predetermined virtual use period. Steps 5502 through 5506 occur continuously with antennae summer until step 5422 is realized in the present embodiment. Following step 5508, flowchart 5500 proceeds to step 5510.

In step 5510 of the present embodiment the passive buffer is changed to an active buffer for the antenna summer that just completed steps 5502 through 5506. Step 5510 is implemented in the present embodiment by toggling the status of RAM A 254*a* and RAM B 254*b* in antenna summer block 150. If data was accumulated in RAM A 254*a* from steps 5502 to 5506 for antenna A, then RAM B 254*b* ceases communication to previous antenna B 201*b* via bus 137 while RAM A 254*a* now becomes the active buffer that initiates transmission of data via bus 137 to antenna A 201*a* in FIG. 2B.

Alternatively, step 5510 is implemented in antenna summer block 150*a* by ceasing communication from an active antenna summer transmitting to an antenna from the previous index of primary table 280*a*, e.g., antenna summer B 250*b* transmitting to antenna B 201*b*. In its place, the antenna summer that has just completed execution of steps 5502 through 5506 is now slated for the active antenna to transmit to its coupled antenna, e.g., antenna buffer A 250*a* transmits to coupled antenna A 201*a*. Antenna summer 150*b* also receives control information from primary table 280*a* indicating when the read back and transmit functions for the RAMs, e.g., RAM A 254*a* and RANI B 254*b*, should be toggled. In one embodiment, an antennae may have more than one entry in primary table 280*a*, depending on the quantity of UTU resources required to satisfy the channel formatting and data assembly, and depending upon the users on a given antenna. If more than one entry for primary table 280*a* is utilized for an antenna, then antenna summer 150*a* and 150*b* continue accumulation of output data from UTS 140 of FIG. 2A. Following step 5510, flowchart 5500 proceeds to step 5512.

In step 5512 of the present embodiment a new passive buffer is implemented. Step 5512 is implemented in antenna summer block 150*b* for the present embodiment by configuring MUX A 256*a* and MUX B 256*b* to provide feedback from RAM B 254*b*, the new passive buffer, to accumulator 252. Data is accumulated for the subsequent antenna in primary table 280*a*, e.g., antenna H. Similarly, for antenna summer block 150*a* a new antenna buffer is slated for passive buffer to accumulate data for UTUs associated with the new antenna executing steps 5502 through 5506, e.g., antenna summer H 250*h*, as indicated by primary table 280*a* of FIG. 2D. Following step 5512, flowchart 5500 proceeds to step ends.

Figure 5F:
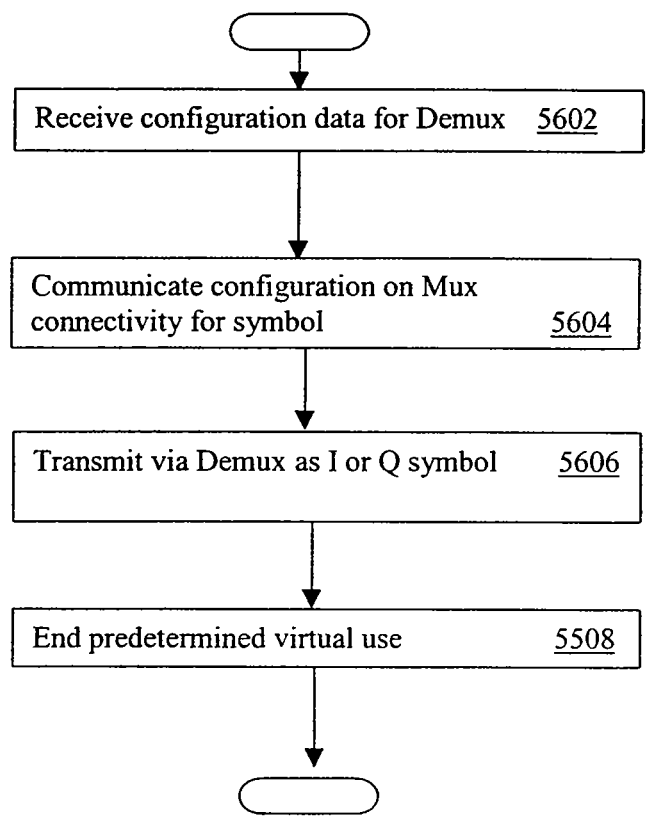
FIG. 5F is a flowchart of a process for operating a configurable modulator, in accordance with one embodiment of the present invention.

Referring now to FIG. 5F, a flowchart of a process for operating a configurable modulator is shown, in accordance with one embodiment of the present invention. Flowchart 5600 provides an exemplary embodiment of the detailed steps for implementing step 5414 of FIG. 5D.

In step 5602 of the present embodiment a configuration for the demux is received. Step 5602 is implemented in the present embodiment by receiving mux control input, e.g., table 400B of FIG. 4B, locally to demux 222 of FIG. 4A. Configuration input is shown as mux control 442 in FIG. 4A, and is stored as context memory. Following step 5602, flowchart 5600 proceeds to step 5604.

In step 5604 of the present embodiment, the configuration for Mux connectivity is communicated for the appropriate point in the cycle. Step 5604 is implemented by communicating data out from the appropriate row in the Mux selector table 400B to demux 422. For example, select tap 1 456 column and select tap 2 458 column of table 400B have an entry in the first row of '3' and '2', respectively. This represents the two non-inverted data bits that represent symbol T'-1 440 in FIG. 4A for a non-diversity quadrature phase shift key (QPSK) modulation scheme. The T'-1 symbol 440 is actually the current sample while symbol T' 438 is a future sample, according to the bit loading protocol of the diversity encoder/multiplexer 322 as described in FIG. 4A. In view of this protocol, the second cycle of diversity encoder and multiplication block 322 reads a second row of table 400b with entries of '1' and '0' for select tap 1 456 column and select tap 2 458 column, respectively for the next symbol in time, T' 438. Because two new symbols worth of data are shifted into shift register 430 after this step, the process repeats itself with the next symbol of data being symbol T-1 440, with desired tap 1 column 456 and desired tap 2 column 458 entries of '3' and '2' respectively. Following step 5604, flowchart 5600 proceeds to step 5606

In step 5606 of the present embodiment data is transmitted from shift register tap(s) via demux as either I or Q symbol data. Step 5606 is implemented in the present embodiment by the selectivity of demux 422 per mux control input 442 from table 400B of FIG. 4B, transmitting data from shift register 430 through interconnect 420 and out of demux 422 on lines I 426 and Q 424. Depending upon the protocol established, the I or Q data is either sign or magnitude information for subsequent amplitude or phase modulation operations. Steps 5604 through 5606 repeat for the duration of the virtual use for which the UTU has been scheduled, as described in FIGS. 2C and 2D.

In step 5608 of the present embodiment the end of the predetermined virtual use occurs. Step 5608 is implemented in the present embodiment by receiving a signal that indicates the end of the virtual use. After the operation of a processing portion, e.g., process 266b, of a virtual use, e.g., virtual use 1 266, a save operation, e.g., save 266c, will save the position in the mux selector table as context data in memory 222. This saved context information will be reused on the next system cycle when the virtual use is again implemented for the particular channel represented in this example. Steps 5604 through 5606 repeat continuously until step 5608 is realized in the present embodiment. Following step 5608, flowchart 5600 ends.

Time slicing, or reuse of hardware resources, is not required by the present invention to implement flowcharts 5000 through 5600. Rather, flowcharts 5200 through 5600, and hardware resourced of UTS 140, can be operated in a dedicated manner without reuse in a context switched time slice manner in another embodiment. In this latter embodiment, some of the steps of the noted flowcharts are not required, and some of the apparatus used to support the time slicing is similarly not required While the present embodiment applies flowcharts 5000 through 5600 to a digital wireless communication system, the present invention can be applied to any electronic device for any type of application. Within the wireless communication system described in the present embodiment, the present invention is applicable to mobile units, base stations, etc. Furthermore, while flowcharts 5000 through 5600 of the present embodiment show a specific sequence and quantity of steps, the present invention is suitable to alternative embodiments. For example, not all the steps provided in the aforementioned flowcharts are required for the present invention. Similarly, other steps may be omitted depending upon the application. In contrast, the present invention is well suited to incorporating additional steps to those presented, as required by an application, or as desired for permutations in the process. Lastly, the sequence of the steps for flowcharts 5000 through 5600 can be modified depending upon the application. Thus, while the present flowcharts are shown as a single serial process, they can also be implemented as a continuous or parallel process.

Many of the instructions for the steps, as well as the data input and output from the steps of flowcharts 5000 through 5600 are at least partially implemented utilizing memory and processor hardware components, e.g., system memory 120 and processor 122 in FIG. 1A, or local memory 222 and controller 224 of FIG. 2A. The memory storage used to implement the flowchart steps in the present embodiment can either be permanent, such as read only memory (ROM), or temporary memory such as random access memory (RAM). Similarly, the processor used to implement the flowchart steps can either be a dedicated controller, an existing system processor, or it can be a dedicated digital signal processor (DSP), as appropriate for the type of step. Alternatively, the instructions may be implemented using some from of a state machine.

Some portions of the detailed description, e.g., the processes, are presented in terms of procedures, logic blocks, processing, and other symbolic representations of operations on data bits within a computer or digital system memory or on signals within a communication device. These descriptions and representations are the means used by those skilled in the digital communication arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a communication device or a processor. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels to be interpreted further in view of terms commonly used in the art. Unless specifically stated otherwise as apparent from the following discussions, it is understood that throughout discussions of the present invention, terms such as "providing," "transmitting," "repeating," "communicating," "synchronizing," "linking," "executing," "reading," "identifying," "jumping," "returning," "generating," or the like, refer to the action and processes of a communication device or a similar electronic computing device, that manipulates and transforms data. The data is represented as physical (electronic) quantities within the communication devices components, or the computer system's registers and memories, and is transformed into other data similarly represented as physical quantities within the communication device components, or computer system memories or registers, or other such information storage, transmission or display devices.

In view of the embodiments described herein, the present invention has been shown to provide a method and apparatus that overcomes the limitations associated with the varied hardware, software, and methodology of transmitting digital signals that are unique and incompatible between each of the various communication protocols. Furthermore, embodiments described for the present invention overcome the lack of forward compatibility associated with incremental improvements in communication protocols. Additionally, the present invention overcomes the potential mismatch between transmitter resources designed for a specific channel format and the changing transmitter resource demand in a given communication device. The limitations of fixed interfaces between transmitter resources and antenna resources and the limitations of a cross bar switch in selectively coupling transmitter resources to antenna resources are also overcome by the method and apparatus of the present invention. The present invention also overcomes the limitations of pushing data through a communications device to the transmitter.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A configurable transmitter resource for generating any one of a plurality of channel formats, the configurable transmitter resource comprising:
   a memory comprising information for the plurality of channel formats to which the configurable transmitter resource can be configured;
   a processor coupled to the memory, the memory comprising instructions and data that, when executed on the processor, implement a method for operating the configurable transmitter resource; and
   a universal transmitter unit coupled to the processor and comprising a plurality of hardware resources operating within a system cycle, wherein each of the hardware resources is configured to selectively provide one of a plurality of data samples for modulating a data signal-wherein the plurality of virtual resources are respective time-sliced uses of a same hardware resource.

2. The configurable transmitter resource recited in claim 1, wherein the hardware resources are configurable to modulate data for a plurality of modulations schemes.

3. The configurable transmitter resource recited in claim 1, wherein the plurality of channel format information is stored in a slot format table including any combination of puncturing information, slot size, spreading factor, or identification of a source of data.

4. The configurable transmitter resource recited in claim 1, further comprising:
   at least one parameterizeable interface coupled to the local memory, the parameterizeable interface configurable to any one of the plurality of transmission signal types designated by control information.

5. In a configurable transmitter resource having a universal transmitter unit and a memory including a plurality of channel formats to which the configurable transmitter resource can be configured, a method comprising:
   selectively providing, by at least one of a plurality of hardware resources operating within a system cycle and located in the universal transmitter unit, one of a plurality of data samples for modulating a data signal in accordance with any one of the plurality of channel formats;
   modulating, by the at least one of the plurality of hardware resources, the data signal in accordance with the channel format; and
   wherein the plurality of virtual resources are respective time-sliced uses of a same hardware resource.

* * * * *